大专利号：US 10,148,458 B2

United States Patent
Han et al.

(10) Patent No.: US 10,148,458 B2
(45) Date of Patent: Dec. 4, 2018

(54) METHOD TO SUPPORT MULTI-PROTOCOL FOR VIRTUALIZATION

(71) Applicant: Futurewei Technologies, Inc., Plano, TX (US)

(72) Inventors: Lin Han, San Jose, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 24 days.

(21) Appl. No.: 15/349,856

(22) Filed: Nov. 11, 2016

(65) Prior Publication Data

US 2018/0139073 A1    May 17, 2018

(51) Int. Cl.
| | |
|---|---|
| H04L 12/28 | (2006.01) |
| H04L 12/46 | (2006.01) |
| H04L 29/12 | (2006.01) |
| H04L 12/931 | (2013.01) |
| H04L 12/713 | (2013.01) |

(Continued)

(52) U.S. Cl.
CPC ...... *H04L 12/4683* (2013.01); *H04L 12/4625* (2013.01); *H04L 12/4633* (2013.01); *H04L 12/4641* (2013.01); *H04L 45/50* (2013.01); *H04L 45/586* (2013.01); *H04L 45/745* (2013.01); *H04L 49/602* (2013.01); *H04L 61/6022* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2015/0063353 A1* | 3/2015 | Kapadia | H04L 45/745 370/392 |
| 2016/0149808 A1* | 5/2016 | Cai | H04L 67/10 370/395.53 |
| 2016/0211989 A1* | 7/2016 | Jain | H04L 12/4633 |

(Continued)

OTHER PUBLICATIONS

Farinacci, D., et al., "Generic Routing Encapsulation (GRE)", RFC 2784, Mar. 2000, 9 pages.

(Continued)

*Primary Examiner* — Minh Trang T Nguyen
(74) *Attorney, Agent, or Firm* — Conley Rose, P.C.

(57) ABSTRACT

A network element (NE) configured as a local cloud switch point (CSP) comprises a memory configured to store remote virtual routing information in association with an identifier (ID) of a remote CSP in a mapping table, wherein the remote virtual routing information is associated with a remote virtual network associated with the remote CSP, and wherein the remote virtual routing information comprises a virtual extensible network (VXN) type identifier (ID), an address family ID (AFI), and a subsequent AFI (SAFI). The NE further comprises a processor coupled to the memory and configured to perform encapsulation on a data packet to generate a encapsulated data packet by adding an outer header to the data packet based on the AFI, adding a virtualization header to the data packet based on the VXN type ID, and adding an inner header to the data packet based on the SAFI. The NE further comprises a transmitter coupled to the processor and configured to transmit the encapsulated data packet to the remote CSP.

21 Claims, 16 Drawing Sheets

(51) Int. Cl.
*H04L 12/723* (2013.01)
*H04L 12/741* (2013.01)

(56) References Cited

U.S. PATENT DOCUMENTS

2016/0352632 A1* 12/2016 Nedeltchev .......... H04L 45/502
2016/0359720 A1   12/2016 Li et al.

OTHER PUBLICATIONS

Dommety, G., "Key and Sequence Number Extensions to GRE", RFC 2890, Sep. 2000, 7 pages.
Rosen, E., et al., "Multiprotocol Label Switching Architecture", RFC 3031, Jan. 2001, 57 pages.
Rosen, E., et al., "BGP/MPLS IP Virtual Private Networks (VPNs)", RFC 4364, Feb. 2006, 47 pages.
Mahalingam, M., et al., "Virtual eXtensible Local Area Network (VXLAN): A Framework for Overlaying Virtualized Layer 2 Networks over Layer 3 Networks", RFC 7348, Aug. 2014, 22 pages.
Sajassi, A., Ed., et al., "BGP MPLS-Based Ethernet VPN", RFC 7432, Feb. 2015, 56 pages.
Garg. P., Ed., et al., "NVGRE: Network Virtualization Using Generic Routing Encapsulation", RFC 7637, Sep. 2015, 17 pages.
Li, Renwei; U.S. Appl. No. 62/154,164 Title: "Generic Packet Encapsulation for Virtual Networking"; filed Apr. 29, 2015.

* cited by examiner

900

```
     0                   1                   2                   3
     0 1 2 3 4 5 6 7 8 9 0 1 2 3 4 5 6 7 8 9 0 1 2 3 4 5 6 7 8 9 0 1
                                                                909A
   Network information list (Must be present) 906
         +-+-+-+-+-+-+-+-+-+-+-+-+-+-+-+-+-+-+-+-+-+-+-+-+-+-+-+-+-+-+-+
903 ──┼ Opt    |      Total Network len    | | Network_1 (Variable)| |
         +-+-+-+-+-+-+-+-+-+-+-+-+-+-+-+-+-+-+-+-+-+-+-+-+-+-+-+-+-+-+-+
         |                      . . . . . .                          |
         +-+-+-+-+-+-+-+-+-+-+-+-+-+-+-+-+-+-+-+-+-+-+-+-+-+-+-+-+-+-+-+
909N ──┼                    Network_n (Variable)                      |
         +-+-+-+-+-+-+-+-+-+-+-+-+-+-+-+-+-+-+-+-+-+-+-+-+-+-+-+-+-+-+-+
```

Network information format is determined by SAFI value
1. For IPv4/IPv6, Opt=1, it is Prefix format and same as NLRI defined in RFC2858
2. For MAC, Opt=2, it is Ethernet address (6byte)
3. For 802.1Q, Opt=3, it is for 802.1Q payload, format is "PRI(3bit), CFI(1bit), VLANID(12bit),Ethernet address (6byte)", each has 8 byte

FIG. 9

| Control Protocol Parameters 1003 | | | | | | Data Path Parameters 1006 | | | Use case 1009 |
|---|---|---|---|---|---|---|---|---|---|
| CSP peering Address 1012 | VXN Type ID (value) 1015 | AFI (value) 1018 | SAFI (value) 1021 | NH Addr format 1025 | Network Information format 1027 | VXN Header 1030 | Outer header protocol and address (except MAC) 1033 | VXNID Field (size) 1036 | Inner payload type 1039 | |
| IPv4 | GVE(0) | IPv4(1) | Unicast (1) | Same as AFI | IPv4 prefix unicast | GVE header | IPv4, NH Addr Protocol= GVE | GVE header (4) | IPv4 | L3 VPN over IP |
| IPv6 | GVE(0) | IPv6(2) | Unicast (1) | Same as AFI | IPv6 prefix unicast | GVE header | IPv6, NH Addr Protocol=GVE | GVE header (4) | IPv6 | L3 VPN over IP |
| IPv4 | GVE(0) | IPv4(1) | Multicast (2) | Same as AFI | IPv4 prefix Multicast | GVE header | IPv4, NH Addr Protocol=GVE | GVE header (4) | IPv4 | L3 VPN over IP |
| IPv6 | GVE(0) | IPv6(2) | Multicast (2) | Same as AFI | IPv6 prefix Multicast | GVE header | IPv6, NH Addr Protocol=GVE ] | GVE header (4) | IPv6 | L3 VPN over IP |
| IPv4 | GVE(0) | IPv4(1) | Unicast (1) | Same as AFI | IPv4 prefix Unicast | GVE header | MPLS Bottom of stack S=1 | GVE header (4) | IPv4 | L3 VPN over MPLS (using GVE as VXNID) |
| IPv6 | GVE(0) | IPv6(2) | Unicast (1) | Same as AFI | IPv6 prefix Unicast | GVE header | MPLS Bottom of stack S=1 | GVE header (4) | IPv6 | L3 VPN over MPLS (using GVE as VXNID) |
| IPv4 | GVE(0) | IPv4(1) | Multicast (2) | Same as AFI | IPv4 prefix Multicast | GVE header | MPLS Bottom of stack S=1 | GVE header (4) | IPv4 | L3 VPN over MPLS (using GVE as VXNID) |
| IPv6 | GVE(0) | IPv6(2) | Multicast (2) | Same as AFI | IPv6 prefix Multicast | GVE header | MPLS Bottom of stack S=1 | GVE header (4) | IPv6 | L3 VPN over MPLS (using GVE as VXNID) |

FIG.10A

| CSP peering Address 1012 | Control Protocol Parameters 1003 ||||| Data Path Parameters 1006 |||| Use case 1009 |
| --- | --- | --- | --- | --- | --- | --- | --- | --- | --- | --- |
| | VXN Type ID (value) 1015 | AFI (value) 1018 | SAFI 1021 | NH Addr format 1025 | Network Information format 1027 | VXN Header 1030 | Outer header protocol and address (except MAC) 1033 | VXN Header 1036 | Inner payload type 1039 | |
| IPv4 | GVE (0) | IPv4 (1) | New SAFI MAC | Same as AFI | Ethernet (Dst MAC) | GVE header | IPv4 UDP, NH Addr Protocol=GVE | GVE header (4) | Ethernet | NVO3, L2 VPN, VPLS over IP |
| IPv6 | GVE (0) | IPv6 (2) | New SAFI MAC | Same as AFI | Ethernet (Dst MAC) | GVE header | IPv6 UDP, NH Addr Protocol=GVE | GVE header (4) | Ethernet | NVO3, L2 VPN, VPLS over IP |
| IPv4 | NVGRE (2) | IPv4 (1) | New SAFI MAC | Same as AFI | Ethernet (Dst MAC) | NVGRE header | IPv4 UDP, NH Addr Protocol=GRE | NVGRE header (8) | Ethernet | NVO3, L2 VPN, VPLS over IP |
| IPv6 | NVGRE (2) | IPv6 (2) | New SAFI MAC | Same as AFI | Ethernet (Dst MAC) | NVGRE header | IPv6 UDP, NH Addr Protocol=GRE | NVGRE header (8) | Ethernet | NVO3, L2 VPN, VPLS over IP |
| IPv4 | MPLS (3) | IPv4 (1) | New SAFI MAC | Same as AFI | Ethernet (Dst MAC) | MPLS header | MPLS, Bottom of stack S=1 | MPLS header (4) | Ethernet | L2 VPN and VPLS over MPLS |
| IPv6 | MPLS (3) | IPv6 (2) | New SAFI MAC | Same as AFI | Ethernet (Dst MAC) | MPLS header | MPLS, Bottom of stack S=1 | MPLS header (4) | Ethernet | L2 VPN and VPLS over MPLS |

FIG. 10C

| CSP peering Address 1012 | Control Protocol Parameters 1003 | | | | Data Path Parameters 1006 | | | Use case 1009 |
|---|---|---|---|---|---|---|---|---|
| | VXN Type ID 1015 | AFI 1018 | SAFI 1021 | NH Addr format 1025 | Network Information format 1027 | VXN Header 1030 | Outer header protocol and address (except MAC) 1033 | VXN Header 1036 | Inner pay load type 1039 | |
| IPv4 | GVE (0) | IPv4 (1) | New SAFI MAC (802.1Q) | Same as AFI | Ethernet (Dst MAC, VLAN ID), 8 octects | GVE header | IPv4, NH Addr Protocol=GVE | GVE header (4) | 802.1Q | NVO3, L2 VPN, VPLS O IP |
| IPv6 | GVE (0) | IPv6 (2) | New SAFI MAC (802.1Q) | Same as AFI | Ethernet (Dst MAC, VLAN ID), 8 octects | GVE header | IPv6, NH Addr Protocol= GVE | GVE header (4) | 802.1Q | NVO3, L2 VPN, VPLS O IP |
| IPv4 | VxLAN (1) | IPv4 (1) | New SAFI MAC (802.1Q) | Same as AFI | Ethernet (Dst MAC, VLAN ID), 8 octects | VxLAN header | IPv4, NH Addr Protocol = UDP | VxLAN header (8) | 802.1Q | NVO3, L2 VPN, VPLS O IP |
| IPv6 | VxLAN (1) | IPv6 (2) | New SAFI MAC (802.1Q) | Same as AFI | Ethernet (Dst MAC, VLAN ID), 8 octects | VxLAN header | IPv6, NH Addr Protocol = UDP | VxLAN header (8) | 802.1Q | NVO3, L2 VPN, VPLS O IP |
| IPv4 | MPLS (3) | IPv4 (1) | New SAFI MAC (802.1Q) | Same as AFI | Ethernet (Dst MAC, VLAN ID), 8 octects | MPLS header | MPLS Bottom of stack S=0 | MPLS header (4) | 802.1Q | L2 VPN and VPLS O MPLS |
| IPv6 | MPLS (3) | IPv6 (2) | New SAFI MAC (802.1Q) | Same as AFI | Ethernet (Dst MAC, VLAN ID), 8 octects | MPLS header | MPLS Bottom of stack S=0 | MPLS header (4) | 802.1Q | L2 VPN and VPLS O MPLS |

FIG. 10D

METHOD TO SUPPORT MULTI-PROTOCOL FOR VIRTUALIZATION

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing utilizes a shared pool of configurable resources. The computing environment including the shared pool of resources is referred to as a cloud or a cloud network. The resources may be virtual instances of resources executing on virtual machines (VMs). The shared pool of resources may include computing resources, storages, and applications. The computing environment or cloud may adapt to an increase in service usage by providing additional resource instances to the pool. The shared pool of resources may reside internal to a private enterprise network or as part of a public network. The shared pool of resources may reside across one or more networks operating under one or more networking domains.

SUMMARY

Cloudcasting is an emerging network routing and forwarding technology that enables devices connected to different virtual networks to communicate with each other, where the virtual networks may be built over a networking infrastructure that is shared among the virtual networks. Currently, the devices that are connected to different virtual networks do not have a mechanism by which to communicate with each other when the different virtual networks employ different virtualization protocols. The embodiments of the present disclosure solve this problem by introducing methods and network elements (NEs) that are configured to communicate with other NEs in the different virtual networks that employ different virtualization protocols by employing an encapsulation scheme that adds different outer headers, inner headers, and virtualization headers to data packets based on the contents of post messages received from remote devices.

In one embodiment, the disclosure includes a method implemented by an NE configured as a local cloud switch point (CSP), the method comprising receiving, via a receiver at the NE, a post message from a remote CSP via a cloudcasting network, wherein the post message comprises remote virtual routing information associated with a remote virtual network associated with the remote CSP, wherein the remote virtual routing information comprises a virtual extensible network (VXN) type identifier (ID), an address family ID (AFI), and a subsequent AFI (SAFI), wherein the VXN type ID identifies a virtualization protocol associated with the remote virtual network, wherein the AFI identifies an address type of the remote CSP, and wherein the SAFI identifies an type of a virtual network element (VNE) in the remote virtual network, receiving, via the receiver, a data packet from a local virtual network associated with the local CSP, wherein the data packet is destined for the remote virtual network, encapsulating, via a processor of the NE, a data packet to generate a encapsulated data packet by adding an outer header to the data packet based on the AFI, adding a virtualization header to the data packet based on the VXN type ID, and adding an inner header to the data packet based on the SAFI, and sending, via a transmitter at the NE, the encapsulated data packet to the remote CSP to facilitate data transportation between the local virtual network and the remote virtual network across the cloudcasting network. In some embodiments, the disclosure further includes wherein the remote CSP employs the virtualization protocol to forward data traffic to other CSPs, and wherein the VXN type ID identifies at least one of a generic VXN encapsulation (GVE) protocol, a virtual extensible local area network (VXLAN) protocol, a Network Virtualization using Generic Routing Encapsulation (NVGRE) protocol, or Multiprotocol Label Switching (MPLS) protocol, and/or wherein the AFI comprises an ID of at least one of an Internet protocol version four (IPv4) address and an Internet protocol version six (IPv6) address, and/or wherein the SAFI comprises an ID of a media access control address, and/or wherein the SAFI comprises an ID of an 802.1Q address, and/or further comprising storing the VXN type ID, AFI, and SAFI in a mapping database stored at a memory of the local CSP.

In one embodiment, the disclosure includes an NE configured as a local CSP, comprising a memory configured to store remote virtual routing information in association with an ID of a remote CSP in a mapping table, wherein the remote virtual routing information is associated with a remote virtual network associated with the remote CSP, and wherein the remote virtual routing information comprises a VXN type ID, an AFI, and a SAFI, a processor coupled to the memory and configured to perform encapsulation on a data packet to generate a encapsulated data packet by adding an outer header to the data packet based on the AFI, adding a virtualization header to the data packet based on the VXN type ID, and adding an inner header to the data packet based on the SAFI, and a transmitter coupled to the processor and configured to transmit the encapsulated data packet to the remote CSP to facilitate data transportation between the local virtual network and the remote virtual network across a cloudcasting network. In some embodiments, the disclosure further includes further comprising a receiver coupled to the processor and configured to receive a post message from the remote CSP via the cloudcasting network, wherein the post message comprises the remote virtual routing information, wherein the remote virtual routing information further comprises a VXN ID, wherein the VXN ID identifies the remote virtual network in the cloudcasting network, wherein the VXN type ID identifies a virtualization protocol associated with the remote virtual network, wherein the AFI identifies an address type of the remote CSP, and wherein the SAFI identifies an address type of a VNE in the remote virtual network, and/or wherein the remote virtual routing information further indicates a plurality of VNEs in the remote virtual network, and wherein the processor is further configured to determine that a destination of the data packet corresponds to a first VNE of the plurality of VNEs in the remote virtual network according to the remote virtual routing information stored in the mapping table, and obtain a VXN ID that identifies the remote virtual network in the cloudcasting network and an address of the first VNE from the mapping table after determining that the destination corresponds to the first VNE, and/or wherein the virtualization header is a GVE header comprising the VXN ID when the VXN type ID indicates that the virtualization protocol associated with the remote virtual network is a GVE protocol, and/or wherein the virtualization header is a VXLAN header comprising the VXN ID when the VXN type ID indicates that the virtualization protocol associated with the remote virtual network is a VXLAN protocol, and/or wherein the virtualization header is an MPLS header comprising the VXN ID when the VXN type ID indicates that the virtualization protocol associated with the remote virtual network is a MPLS protocol.

In an embodiment, the disclosure includes an NE configured as a CSP, comprising a processor configured to generate a post message comprising virtual routing information associated with a virtual network associated with the CSP, wherein the virtual routing information comprises a VXN type ID, an AFI, and a SAFI, wherein the VXN type ID identifies a virtualization protocol associated with the virtual network, wherein the AFI identifies an address type of the CSP, and wherein the SAFI identifies an address type of a VNE in the virtual network, and a transmitter coupled to the processor and configured to transmit the post message to a remote CSP via a cloudcasting network. In some embodiments, the disclosure further includes wherein the AFI comprises an ID of at least one of an IPv4 address and an IPv6 address, and/or wherein the SAFI comprises an ID of at least one of a unicast address or a multicast address, and/or wherein the SAFI comprises an ID of at least one of a unicast address, multicast address, a media access control (MAC) address, or an 802.1Q address, and/or wherein the post message is transmitted after the CSP has completed registration with a cloud rendezvous point (CRP) in the cloudcasting network, and/or wherein the post message further comprises an address of the CSP, and wherein the address is formatted according on the AFI, wherein the post message further comprises a plurality of address of a plurality of VNEs in the virtual network, and wherein the addresses of the VNEs are formatted according to the SAFI.

In an embodiment, the disclosure includes a cloudcasting network system, comprising a local cloud switch point (CSP) comprising a transmitter configured to transmit a post message to a remote CSP, wherein the post message comprises virtual routing information associated with a virtual network associated with the local CSP, wherein the virtual routing information comprises a virtual extensible network (VXN) type identifier (ID), an address family ID (AFI), and a subsequent AFI (SAFI), wherein the VXN type ID identifies a virtualization protocol associated with the virtual network, wherein the AFI identifies an address type of the remote CSP, and wherein the SAFI identifies an address type of a virtual network element (VNE) in the virtual network, a processor coupled to the receive and configured to perform encapsulation on a data packet to generate a encapsulated data packet by adding an outer header to the data packet based on the AFI, adding a virtualization header to the data packet based on the VXN type ID, and adding an inner header to the data packet based on the SAFI, and a transmitter coupled to the processor and configured to transmit the encapsulated data packet to the local CSP to facilitate data transportation between the local virtual network and the remote virtual network across a cloudcasting network.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is an embodiment of a network information options field included in the post message.

FIGS. 10A-D illustrates portions of a CSP-VXN mapping DB.

DETAILED DESCRIPTION

Figure 1:
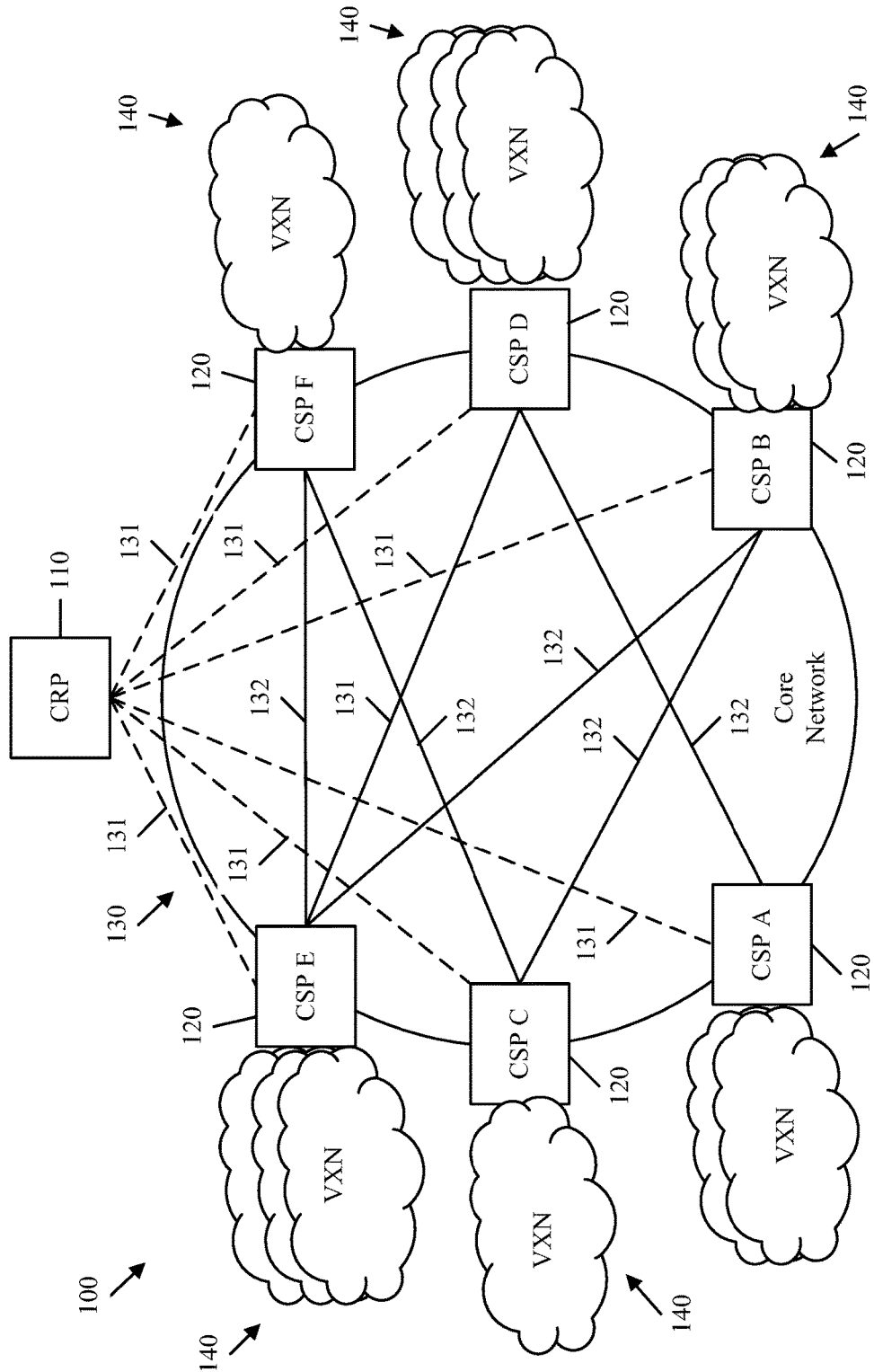
FIG. 1 is a schematic diagram of an embodiment of a cloudcasting network system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Cloud, cloud computing, and/or cloud services may refer to a group of servers, storages, computers, laptops, cell phones, and/or any other types of network devices connected together by an Internet protocol (IP) network and sharing network resources. One of the challenges for cloud computing is network virtualization. Network virtualization is the process of combining hardware and software network resources and network functionality into a single, software-based virtual network.

Some examples of network virtualization technologies are VXLAN, NVGRE, MPLS, and GVE. VXLAN was developed to enable large-scale cloud computing by encapsulating media access control (MAC)-based open system interconnection (OSI) layer 2 (L2) Ethernet frames within OSI layer 4 (L4) user datagram protocol (UDP) packets. A VXLAN encapsulation header is used to indicate a virtual network identifier (VNI) for identifying a certain virtual network. VXLAN allows up to about 16 million virtualized L2 segments overlaid on top of an IP/UDP network.

NVGRE is a tunneling scheme that uses generic routing encapsulation (GRE) routing protocol as defined by Internet engineering task force (IETF) documents request for comments (RFC) 2784 and RFC 2890. NVGRE provides network isolation for a multi-tenant data center (DC) by using a tenant network identifier (TNI) to identify a particular tenant work. NVGRE allows up to about 16 million virtualized layer 2 (L2) segments to span over physical layer 3 (L3) networks. However, NVGRE is limited to tunneling Ethernet frames over IP networks.

MPLS utilizes path labels to identify paths in a network. Data packets are encapsulated with path labels and data forwarding devices forward data traffic based on path labels instead of addresses in a routing table. MPLS tunnels Ethernet frames and IP packets embedded in Ethernet and IP protocols over a physical network. To use MPLS for network virtualization, certain path labels are dedicated to identify a particular virtual network segment.

GVE virtualization techniques involve adding GVE header and a carrier protocol header to data packets to form encapsulated data packets. The GVE header carries a VXN number of the destination VXN at which the destination of the data packet is located. The carrier network header comprises information to reach a destination CSP at which the destination VXN is attached to. GVE provides several benefits when compared to the other encapsulation protocols. For example, GVE may be more efficient for hardware processing since GVE comprises a smaller header (e.g., about 4 octets) than the other encapsulation protocols (e.g., about 8 octets). In addition, since GVE does not employ UDP, no checking of port number is required. GVE is more flexible since GVE supports any types of carrier and payload protocols by communicating the carrier and payload protocols via a cloudcasting control protocol (CCC). Further, GVE may support more virtual networks since the GVE header allows up to twenty-eight bits of VXN number and thus supports up to about 268 million virtual networks.

The IETF initiated a network virtualization overlays (NVO3) working group to study and develop more advanced and/or alternative network virtualization mechanisms and protocols. However, the IETF NVO3 currently focuses on data plane and leverages Ethernet virtual private network (EVPN) control plane, which is based on a border gateway protocol (BGP).

A cloud network may be built in a cloudcasting system over a networking infrastructure that is shared among multiple VXNs. For example, a cloud network comprises multiple portions distributed over geographically dispersed locations and inter-connected by the networking infrastructure. The networking infrastructure may be administered by multiple service providers. The networking infrastructure and the cloud network may execute the same network protocol or different network protocols. In addition, multiple cloud networks may be linked together to provide a particular service, and thus, intra-virtualized-network communication and inter-virtualized-network communication are employed for cloudcasting. In this way, the different VXNs that are built in cloudcasting system may each employ different virtualization protocols, such as VXLAN, NVGRE, MPLS, or GVE. Although VXLAN, NVGRE, MPLS, and GVE provide network virtualizations and some amount of tunneling mechanisms, VXLAN, NVGRE, MPLS, and GVE are each limited to operate over certain OSI layers and may not easily support spanning any virtual networks over any networking infrastructure.

Disclosed herein are various embodiments of a unified cloudcasting network architecture and mechanisms to interconnect geographically dispersed virtual networks of any virtualization network type to communicate with each other over a networking infrastructure of any transport protocol, virtualization protocol, and/or any overlay technology. A cloudcasting network comprises a CRP and a plurality of cloud switch points (CSPs). Each CSP acts as an access point for one or more VXNs or clouds. Each CSP sends CSP identification information, attached VNE identification information, attached VXN identification information to the CRP, and attached VXN type information to remote or peer CSPs. The CSP identification information comprises an AFI that identifies an address type of the CSP and the address of the CSP. The VNE identification information comprises a subsequent AFI (SAF) that identifies an address type of the VNE and the address of the VNE. The VXN identification information comprises a VXN number and/or a VXN name. The VXN type information comprises an identifier of the virtualization protocol employed by the VXN. When a local CSP receives user data packets from an attached VXN, the local CSP encapsulates the received user data packet with an outer header according to the AFI, a virtualization header according to the VXN type information, and an inner header according to the SAFI. The outer header comprises the address of the CSP formatted based on the address format indicated by the AFI. The virtualization header comprises a virtualization header identified by the VXN type information including the VXN identification information. The inner header comprises the address of the VNE formatted based on the address format indicated by the AFI. The disclosed embodiments are suitable for use as a hybrid-cloud interconnect. The disclosed embodiments may be applied to a DC interconnect network to interconnect geographically dispersed multi-tenancy DCs.

FIG. 1 is a schematic diagram of an embodiment of a cloudcasting network system 100. The system 100 comprises a CRP 110 and a plurality of CSPs 120 shown as CSP A, CSP B, CSP C, CSP D, CSP E, and CSP F. The CRP 110 and the CSPs 120 form the functional elements of the system 100. The CRP 110 and the CSPs 120 are communicatively coupled to each other via a core network 130. The underlying physical network of the core network 130 may be any type of transport network such as an electrical network and/or an optical network. The core network 130 may employ any transport protocols such as IP, Ethernet, or another suitable protocol for transporting data over the core network 130. In addition, the core network 130 may employ any network virtualization, network overlay, and tunneling technologies such as MPLS. The core network 130 may operate under one or more networking administrative domains provided by one or more service providers. The underlying physical network operates independent of the transport protocol and is transparent to any network virtualization, network overlay, tunneling technologies, the CRP 110, and the CSPs 120. The system 100 further comprises a plurality VXNs 140. Each of the VXNs 140 is physically or logically attached to one of the CSPs 120. Each of the VXNs 140 is an overlay network, which may be built on top of a L2 network or a L3 network. Some examples of network overlay technologies may include VXLAN, VXLAN-GPE, NVGRE, MPLS, and locator/identifier separation protocol (LISP). The network protocols of the VXNs 140 and the core network 130 are independent of each other and are transparent to each other. The VXNs 140 may comprise virtual networking resources such as VMs, storages, applications, and any other virtual NE VNE suitable for providing network services. The VXNs 140 may further comprise virtual switches (vSwitches) configured to route traffic between the virtual networking resources. The VXNs 140 may employ cloud computing technologies to share the networking resources among multiple users or tenants. The VXNs 140 are also referred to as user clouds. The VXNs 140 are distributed over geographical disperse sites. Cloudcasting enables communications between the distributed VXNs 140. The system 100 may be configured as shown or alternatively configured as determined by a person of ordinary skill in the art to achieve similar functionalities.

The operations of the system 100 are divided into a control plane and a data plane. The control plane employs a cloudcasting control protocol (CCC) to control and manage cloudcasting-related operations such as auto-discovery, registrations, and route information exchange as described in the U.S. patent application Ser. No. 14/728,821 by Renwei Li, et al., and titled "Distribution of Internal Routes for Virtual Networking," ("'821 Application"), which is incorporated by reference in its entirety. The data plane employs any one of a plurality of different virtualization protocols for data forwarding the in the core network 130. For example, the virtualization protocols are at least one of an MPLS protocol, an NVGRE protocol, and VXLAN protocol, or a GVE protocol. As shown, the CRP 110 communicates with the CSPs 120 over a plurality of first links 131 for auto-discovery and registrations, and the CSPs 120 communicate with each other over a plurality of second links 132 for route information exchange and data forwarding. The first links 131 and the second links 132 may comprise physical links and/or logical links. The CRP 110 and/or one or more of the CSPs 120 comprises a mapping DB including mappings of how the content of messages sent in the control plan is used to control the messages sent in the data plane for different virtualization protocols.

The CRP 110 may comprise one or more VMs, servers, and/or network devices configured to control and manage the CSPs 120. The CRP 110 comprises a global view of the CSPs 120 and corresponding VXNs 140 attached to the CSPs 120. For example, the CSPs 120 are identified by network addresses such as IPv4 addresses, IPv6 addresses, and Media Access Control (MAC) addresses. The VXNs 140 are identified by VXN numbers and VXN names that are unique in one or more CCC domains operating on the core network 130. The CRP 110 maintains a CSP information base comprising mappings between the network addresses of the CSPs 120 and the VXN numbers and VXN names of corresponding attached VXNs 140. The CRP 110 operates in the control plane of the system 100. The CRP 110 enforces CSPs 120 authentication, participate in CSPs 120 auto-discovery, and/or any other CCC operations. For example, the CRP 110 exchanges register message and report messages with the CSPs 120 during CCC operations, as described more fully below. It should be noted that, while one CRP 110 is depicted in system 100, multiple CRPs 110 may be employed in any suitable configuration such as a hierarchical configuration and a cluster configuration.

The CSPs 120 may comprise one or more VMs, servers, and/or network devices configured to perform both control plane functions and data plane functions in the system 100. The CSPs 120 function as access points or interconnection points between the distributed VXNs 140. For example, the CSPs 120 are physically or logically located at edges of the VXNs 140. The CSPs 120 are data plane gateways that interface clouds (e.g., the VXNs 140) to a physical network (e.g., the core network 130). Each of the local CSPs 120 (such as CSP A) maintains a CSP-VXN mapping DB comprising mappings between other remote CSPs 120 (such CSP B, CSP C, CSP D, CSP E, and CSP F) in the network 130 and corresponding attached VXNs 140. For example, each mapping comprises a network address of a remote CSP, a list of VXN numbers identifying VXNs 140 that are attached to the remote CSP, and virtual routing information associated with corresponding VXNs 140. The virtual routing information associated with corresponding VXNs 140 comprises information such as a VXN type ID, an AFI, a SAFI, a next hop network address, and/or network information options. In the control plane, each of the CSPs 120 performs auto-discovery and registration with the CRP 110 and exchanges VXN and virtual routing information with other CSPs 120. In the data plane, the CSPs 120 performs encapsulation and decapsulation according to a virtual protocol specified in the virtual routing information to forward data traffic between the VXNs 140.

In operation, when one of the CSPs 120, such as local CSP A 120, is powered up, the local CSP A 120 performs auto-discovery to discover the CRP 110. After performing auto-discovery, the local CSP A 120 begins registration with the CRP 110 by sending a register message to the CRP 110 to provide information associated with the local CSP A 120 (e.g., network address) and attached VXN 140 (e.g., VXN numbers and VXN names). The CRP 110 responds with a report message indicating other remote CSPs 120, such as CSP B, CSP C, CSP D, CSP E, and CSP F, in the system 100 and corresponding attached VXNs 140.

After registration, the local CSP A 120 exchanges virtual routing information associated with attached VXN 140 with the remote CSPs 120 indicated in the report message. The virtual routing information associated with the attached VXN 140 comprises information such as a VXN type ID, and AFI, a SAFI, a next hop address, and/or a network information options. The local CSP A 120 may obtain or collect information of nodes and routes internal to the attached VXN 140 prior to the route exchange, for example, by employing an interior gateway protocol (IGP), a border gateway protocol (BGP), or a label distribution protocol (LDP). The CRP 110 stores CSP information received from each of the CSPs 120 in the CSP information DB. Local CSP A 120 stores CSP information received from the CRP 110, and virtual routing information received from the remote CSPs 120 in the CSP-VXN mapping DB. The CSP-VXN mapping DB also maps the virtual routing information to data plane transmission information such that the virtual routing information is used to properly transmit data to CSPs 120 that utilize other virtualization protocols.

After route exchange, the CSPs 120 may begin data plane processing. During data plane operation, a remote CSP, such as CSP B 120, receives a user data packet from an attached one of the VXNs 140, performs virtualization encapsulation according to a VXN number of one of the VXNs 140 attached to the local CSP A 120, or destination VXN 140, at which a destination of the user data packet is located and the VXN type ID indicating the virtualization protocol employed by the destination VXN 140. The remote CSP B 120 also performs further encapsulation by adding an outer header to the data packets based on the AFI indicating an address type of the local CSP A 120 attached to the destination VXN 140. The remote CSP B 120 also performs further encapsulation by adding an inner header to the data packets based on the SAFI indicating an address type of the VNE in to the destination VXN 140. The remote CSP B 120 forwards the encapsulated data packets to local CSP A 120 at which the destination VXN 140 is attached to. According to the embodiments disclosed herein, virtualization encapsulation involves adding an outer header, a virtualization header, and an inner header to the user data packet according to the virtual routing information stored at the CSP-VXN mapping DB. A local CSP A 120 receives a virtualization encapsulated data packet from a corresponding remote CSP B 120, decapsulates the encapsulated data packets according to the virtual routing information stored at the CSP-VXN mapping DB, and forwards the decapsulated data packet to a corresponding one of the VXNs 140 that is attached to the local CSP A 120. The control plane and data plane operations are described more fully below.

In an embodiment, the system 100 is deployed in a DC interconnect network comprising a plurality of DCs provisioning resources for a plurality of virtual networks or tenant networks distributed across multiple geographical sites. For example, a tenant network comprises one portion located at one of the VXNs 140 attached to the local CSP A 120 and a second portion located at another one of the VXNs 140 attached to the CSP D 120. Thus, the CCC control and data forwarding mechanisms described above enable communication between dispersed portions of a common virtual network or a common tenant network. In such an embodiment, the CSPs 120 and the CRP 110 may be located at DCs, for example, at servers, top of rack (ToR) switches, end of row (EoR) switches, virtual switches (vSwitches), or any other physical NEs or virtual components of the DCs.

Figure 2:
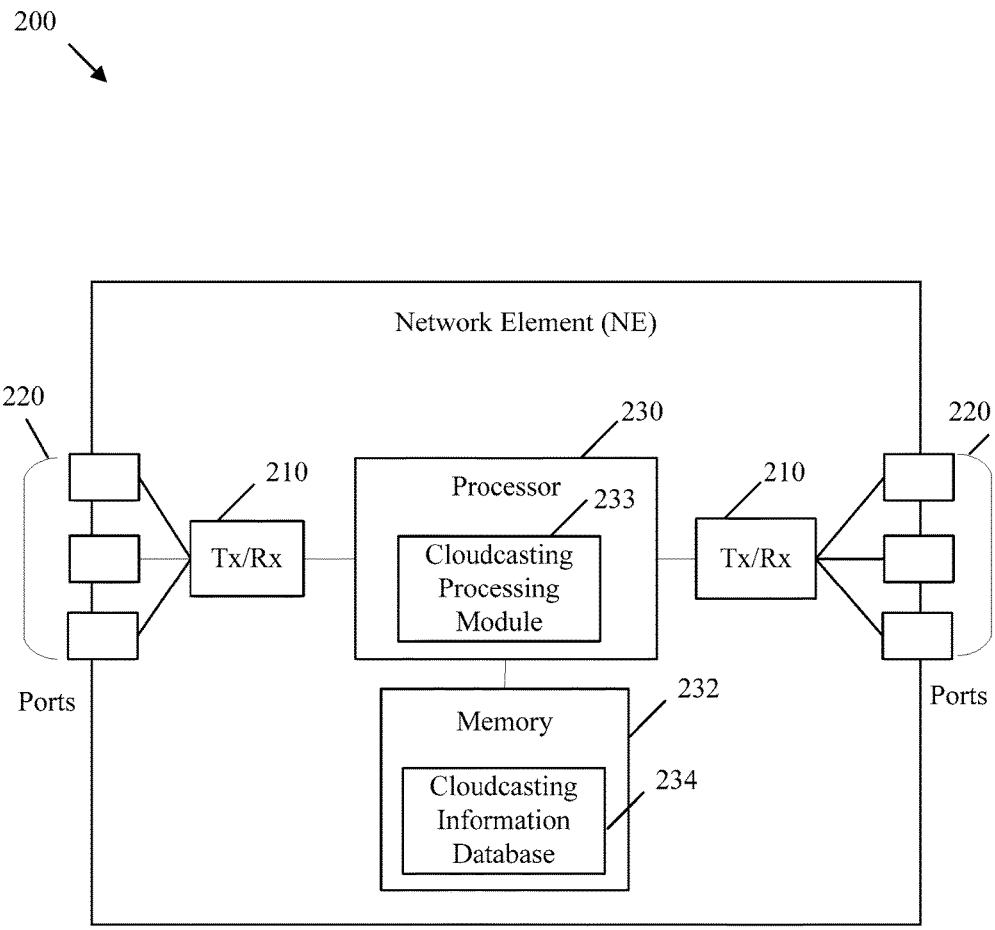
FIG. 2 is a schematic diagram of an embodiment of a NE within a network.

FIG. 2 is a schematic diagram of an embodiment of an NE 200 within a network such as the system 100. For example, NE 200 may act as a CRP 110, one of CSPs 120, and/or any other node in the system 100. NE 200 may be configured to implement and/or support the CCC and data forwarding mechanisms and schemes described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 200. For instance, the features/methods in the disclosure may be implemented using hardware, firmware, and/or software installed to run on hardware. The NE 200 is any device that transports packets through a network, e.g., a switch, router, bridge, server, a client, etc. As shown in FIG. 2, the NE 200 comprises transceivers (Tx/Rx) 210, which may be transmitters, receivers, or combinations thereof. The Tx/Rx 210 is coupled to a plurality of ports 220 for transmitting and/or receiving frames from other nodes.

A processor 230 is coupled to each Tx/Rx 210 to process the frames and/or determine which nodes to send the frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 comprises a cloudcasting processing module 233, which may perform CCC and virtualization encapsulation and may implement methods 600, 1200, and 1300, as discussed more fully below, and/or any other flowcharts, schemes, and methods discussed herein. As such, the inclusion of the cloudcasting processing module 233 and associated methods and systems provide improvements to the functionality of the NE 200. Further, the cloudcasting processing module 233 effects a transformation of a particular article (e.g., the network) to a different state. In an alternative embodiment, the cloudcasting processing module 233 may be implemented as instructions stored in the memory device 232, which may be executed by the processor 230.

The memory device 232 may comprise a cache for temporarily storing content, e.g., a random-access memory (RAM). Additionally, the memory device 232 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 232 is configured to store a cloudcasting information DB 234, which may comprise network information associated with the CSPs 120 and the VXNs 140 depending on the embodiments.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 3:
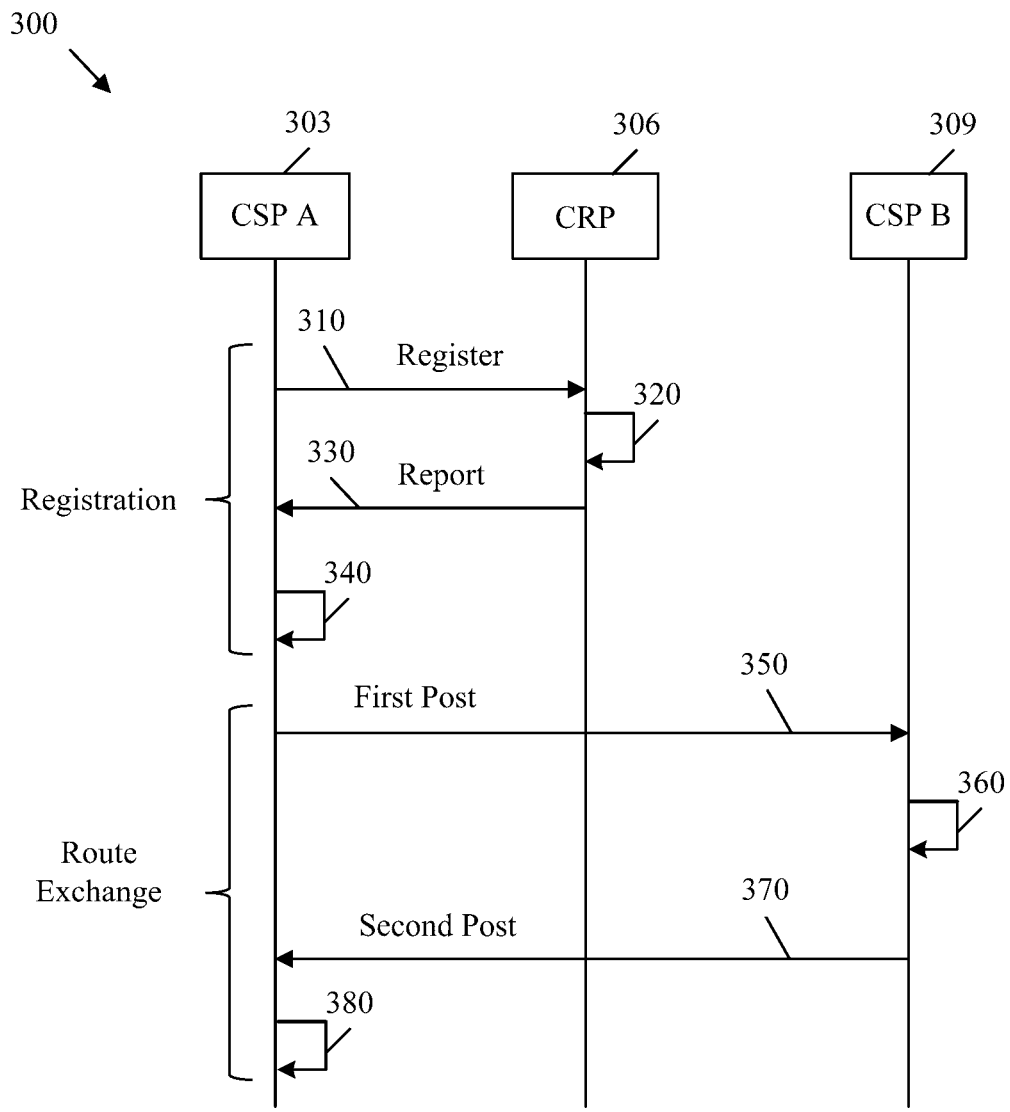
FIG. 3 is a protocol diagram of an embodiment of a method for performing registration and route exchange in a cloudcasting network system.

FIG. 3 is a protocol diagram of an embodiment of method 300 for performing registration and route exchange in a cloudcasting network system such as the system 100. The method 300 is implemented by a first CSP shown as CSP A 303, a second CSP shown as CSP B 309, and a CRP 306. CSP A 303 and CSP B 309 are similar to the CSPs 120. The CRP 306 is similar to the CRP 110. The method 300 is initiated when CSP A 303 powers on or attaches to a new virtual network such as the VXNs 140. At step 310, CSP B 309 begins registration with the CRP 306 by sending a register message to the CRP. The register message comprises CSP A 303's network address and VXN information associated with each VXN attached to CSP A 303. For example, CSP A 303's address may be an IPv4 address, an IPv6 address, or a media access control (MAC) address depending on the network layer protocol in use by the core network such as the core network 130 of the system. The VXN information indicates a VXN name and/or a VXN number that uniquely identifies a corresponding VXN in one or more CCC domains of the system 100. In some embodiments, the register message may also comprise a CSP A 303's ID, which may be a string or a number, and/or an indication of any other VXNs that CSP A 303 is interested in. At step 320, upon receiving the register message, the CRP 306 saves the data received from the register message in a CSP information DB, for example, in a memory device such as the memory device 232.

At step 330, in response to the register message, the CRP 306 sends a report message to CSP A 303. The report message indicates information associated with other CSPs in the system and VXN information of corresponding VXNs. The CSP information indicates network addresses of the other CSPs. The VXN information indicates VXN names and/or VXN numbers identifying the VXNs attached to the other CSPs. In an embodiment, the CRP 306 includes information associated with CSPs that are of interest to CSP A. As an example, the report message indicates information associated with CSP B (e.g., CSP B's address) and corresponding VXNs (e.g., VXN number). In an embodiment, a VXN attached to CSP A 303 and a VXN attached to CSP B 309 are portions of a common VXN such as a tenant network. In such an embodiment, the CRP 306 may simultaneously send a report message to CSP B 309 indicating that CSP A 303 shares a common VXN with CSP B 309 along with CSP A 303's network address. At step 340, upon receiving the report message, CSP A 303 saves the CSP information and the VXN information in a CSP-VXN mapping DB, for example, stored in a memory device.

At step 350, after registration, CSP A 303 begins route exchange by sending a first post message to CSP B 309 according to CSP B 309's address received from the report message. The first post message indicates virtual routing information of VXNs attached to CSP A 303. The virtual routing information comprises information associated with CSP A 303, such as a VXN ID, a VXN type ID, an AFI, a SAFI, and network addresses such as IP addresses and MAC addresses of VMs and VNEs located in the corresponding VXNs, network information options, routes, and/or any combination thereof. The VXN ID may a number or a names corresponding to the VXN. In an embodiment, when a first of the VXNs attached to CSP A shares a common VXN with a first of the VXNs attached to CSP2, CSP A 303 may only indicate virtual routing information associated with the attached first VXN that shares the common VXN. At step 360, upon receiving the first post message, CSP B 309 saves the virtual routing information in association with CSP A in a local CSP-VXN mapping DB of CSP B 309. In an embodiment, CSP B 309 generates data path parameters according to the virtual routing information and saves the data path parameters in the CSP-VXN mapping DB of CSP B 309. For example, when the virtual routing information received from CSP A 303 includes a VXN type ID indicating that CSP A 303 uses a GVE protocol, then CSP B 309 saves data path parameters in the local CSP-VXN mapping DB in association with CSP A 303 indicating that user data packets intended for CSP A 303 should be encapsulated to include a GVE header as the virtualization header.

At step 370, in response to the first post message, CSP B 309 sends a second post message to CSP A 306. The second post message indicates virtual routing information associated with VXNs attached to the CSP B 309. The virtual routing information comprises information associated with CSP B 309, such as a VXN ID, a VXN type ID, an AFI, a SAFI, and network addresses of CSP B 309 and VNEs located in the corresponding VXNs, network information options, and/or any combination thereof. The VXN ID may a number or a names corresponding to the VXN. In an embodiment, when a first of the VXNs attached to CSP A 303 shares a common VXN with a first of the VXNs attached to CSP B 309, CSP B 309 may only indicate virtual routing information of the attached first VXN that shares the common VXN. At step 380, upon receiving the second post message, CSP A 303 saves the VXN and route information in association with CSP B 309 in a local CSP-VXN mapping DB of CSP A. In an embodiment, CSP A 303 generates data path parameters according to the virtual routing information received from CSP B 309 and saves the data path parameters in the local CSP-VXN mapping DB in associated with CSP B 309. For example, when the virtual routing information received from CSP B 309 includes a VXN type ID indicating that CSP B 309 uses an NVGRE protocol, then CSP A 303 saves data path parameters indicating that user data packets intended for CSP B 309 should be encapsulated to include an NVGRE header as the virtualization header. It should be noted that the method 300 may be applied to a cloudcasting network system with any number of CSPs. After completing registration and route exchange, CSP A 303 and CSP B 309 may proceed to operate data plane functions.

Figure 4:
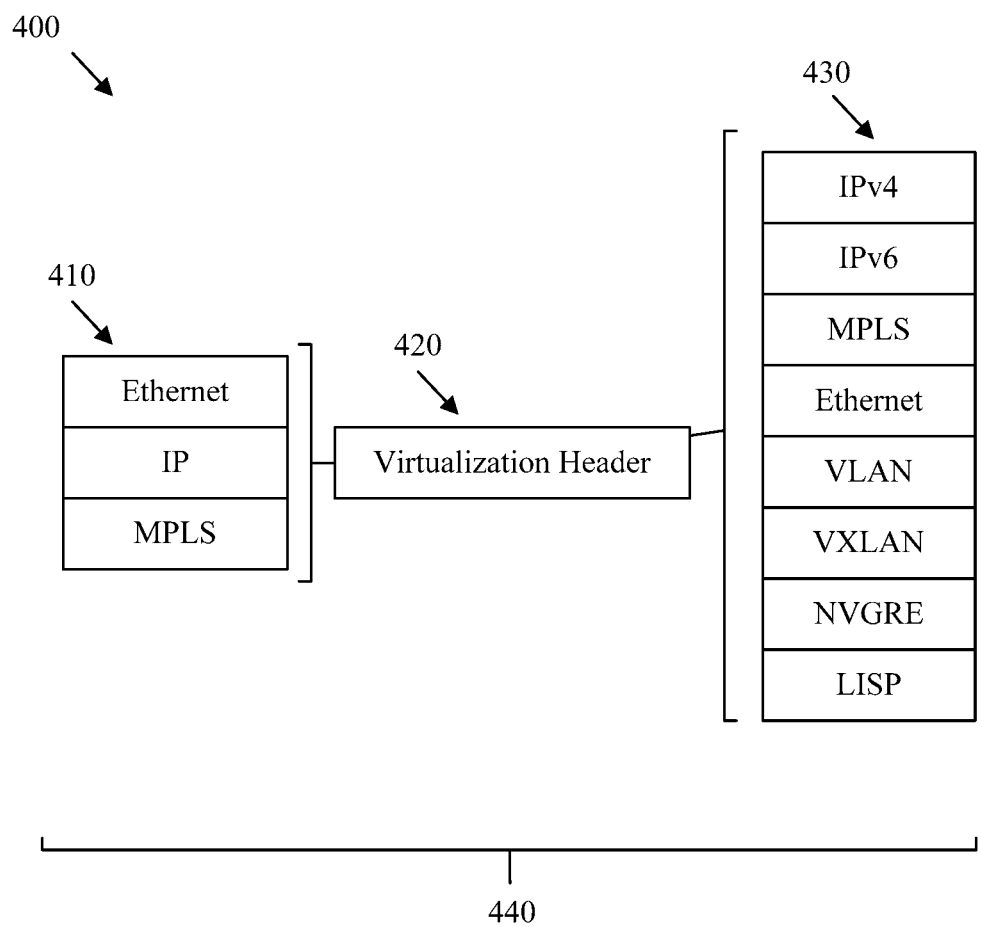
FIG. 4 is a schematic diagram of an embodiment of a method for adding a virtualization header to a user data packet in a cloudcasting network system.

FIG. 4 is a schematic diagram of an embodiment of a method 400 for adding a virtualization header to a user data packet in a cloudcasting network system such as the system 100. The method 400 is implemented by a CSP such as the CSPs 120. The method 400 is implemented after the CSP completed registration with a CRP, such as the CRP 110, and exchanged route information with other CSPs in the system and generated a CSP-VXN mapping DB. For example, the CSP may employ the method 300 for registration and route exchange or any other suitable protocols such as the IGP, the BGP, and the LDP. The method 400 begins when the CSP, acting as a source CSP, receives a user data packet 430 from an attached VXN such as the VXNs 140.

The user data packet 430 carries user data that is originated from a source located in the attached VXN. The user data packet 430 is formatted according to a network protocol in use by the source VXN. As shown, the user data packet 430 may be an IPv4 packet, an IPv6 packet, an Ethernet packet, a virtual local area network (VLAN) packet, a VXLAN packet, an NVGRE packet, a MPLS packet, a LISP packet, or any other network protocol packet.

Upon receiving the user data packet 430, the source CSP determines a destination of the user data packet 430. The source CSP searches the CSP-VXN mapping DB to find a match for the destination. For example, the user data packet 430 indicates a destination address such as an IP address or a MAC address and source CSP searches the virtual routing information in the CSP-VXN mapping DB for the destination address. When a match is found for the destination address, the source CSP obtains the VXN type ID corresponding to the destination address from the CSP-VXN mapping DB. The source CSP then generates the data path parameters based on the control protocol parameters received in the post message and/or searches the CSP-VXN mapping DB for data path parameters corresponding to the destination address. The data path parameters include, among other parameters which will be further described below, the virtualization header protocol. The virtualization header protocol is identified by the VXN type ID, which is a pre-defined value that is associated with a specific virtualization protocol such that all CSPs in the system are aware that the VXN type ID represents the specific virtualization protocol. After finding the match and obtaining the data path parameters for the destination address, the source CSP generates a virtualization header 420 according to the virtualization header protocol and encapsulates the user data packet 430 with the virtualization header 420.

In an embodiment, the virtualization header 420 may be associated with an MPLS protocol, an NVGRE protocol, a VXLAN protocol, or a GVE protocol. The MPLS protocol and the corresponding MPLS header that would be inserted as the virtualization header 420 is described in Internet Engineering Task Force (IETF) document Request for Comments (RFC) 3031, entitled "Multiprotocol Label Switching Architecture," dated January 2001, which is incorporated by reference in its entirety, and ITEF RFC 4364, entitled "BGP/MPLS IP Virtual Private Networks," dated February 2006, which is incorporated by reference in its entirety. The NVGRE protocol and the corresponding NVGRE header that would be inserted as the virtualization header 420 is described in ITEF RFC 7637, entitled "NVGRE: Network Virtualization Using Generic Routing Encapsulation," dated September 2015, which is incorporated by reference in its entirety, and ITEF RFC 7432, entitled "BGP MPLS-Based Ethernet VPN," dated February 2015, which is incorporated by reference in its entirety. The VXLAN protocol and the corresponding VXLAN header that would be inserted as the virtualization header 420 is described in ITEF RFC 7348, entitled "Virtual eXtensible Local Area Network (VXLAN): A Framework for Overlaying Virtualized Layer 2 Networks over Layer 3 Networks," dated August 2014, which is incorporated by reference in its entirety, and ITEF RFC 7432. The GVE protocol and the corresponding GVE header that would be inserted as the virtualization header 420 is described in the U.S. Patent Application No. 62/154,164 by Renwei Li, et al., and titled "Generic Packet Encapsulation For Virtual Networking," ("'164 Application"), which is incorporated by reference in its entirety.

The source CSP may then also generate other data path parameters corresponding to the destination address and/or search the CSP-VXN mapping DB for other data path parameters corresponding to the destination address, such as an identifier of the outer header 410 and an identifier of the inner header and payload type 430. The identifier of the outer header 410 may be associated with an AFI stored at the CSP-VXN mapping DB for the destination address, and the identifier of the inner header and payload type 430 may be associated with a SAFI stored at the CSP-VXN mapping DB for the destination address. The outer header 410 may be based on a carrier protocol or a network layer protocol of a core network such as the core network 130 that connects the source CSP to the other CSPs. For example, the carrier protocol may be IPv4, IPv6, MPLS, or any other type of network protocol suitable for transporting packets in the core network. When the identifier of the outer header indicates that the carrier protocol is IPv4 or IPv6, the outer header 410 is formatted according to the carrier protocol and comprises IPv4 or IPv6 addresses of the source CSP and the destination CSP, respectively. When the identifier of the outer header indicates that carrier protocol is Ethernet, the outer header 410 is an Ethernet header including the MAC addresses of the source CSP and the destination CSP. When the identifier of the outer header indicates that the carrier protocol is MPLS, the outer header 410 is an MPLS header comprising one or more path labels that indicate a path between the source CSP and the destination CSP. After generating the outer header 410, the source CSP attaches the outer header 410 to the virtualization header 420 and the user data packet 430 including the inner header to produce a transport packet 440 and sends the transport packet 440 to the destination CSP. The source CSP may further attach other headers such as an Ethernet header to the transport packet 440 before sending to the destination CSP. When the carrier protocol is Ethernet or VLAN, a new Ether type may be assigned by the IEEE to indicate a protocol of the payload in an Ethernet packet, where the Ether type is carried in a packet header of the Ethernet packet. When the carrier protocol is IPv4 or IPv6, a new protocol number may be assigned by Internet Assigned Number Association (IANA) to indicate a protocol of the payload in an IPv4 or IPv6 packet, where the protocol number is carried in a packet header of the IPv4 or IPv6 packet.

When the destination CSP receives the transport packet 440, the destination CSP performs decapsulation to remove the outer header 410, the virtualization header 420, and the inner header and forwards the user data packet 440 to the destination VXN. It should be noted that the method 400 is also suitable for use with other network control protocols such as IGP, BGP, and LDP in addition to the CCC described in the method 300. In addition, the method 400 is suitable for use as an overlaying technology between two geographically distributed IP networks or Ethernet networks instead of virtual networks. Further, the method 400 may be applied to VXNs of GVE type.

Figure 5:
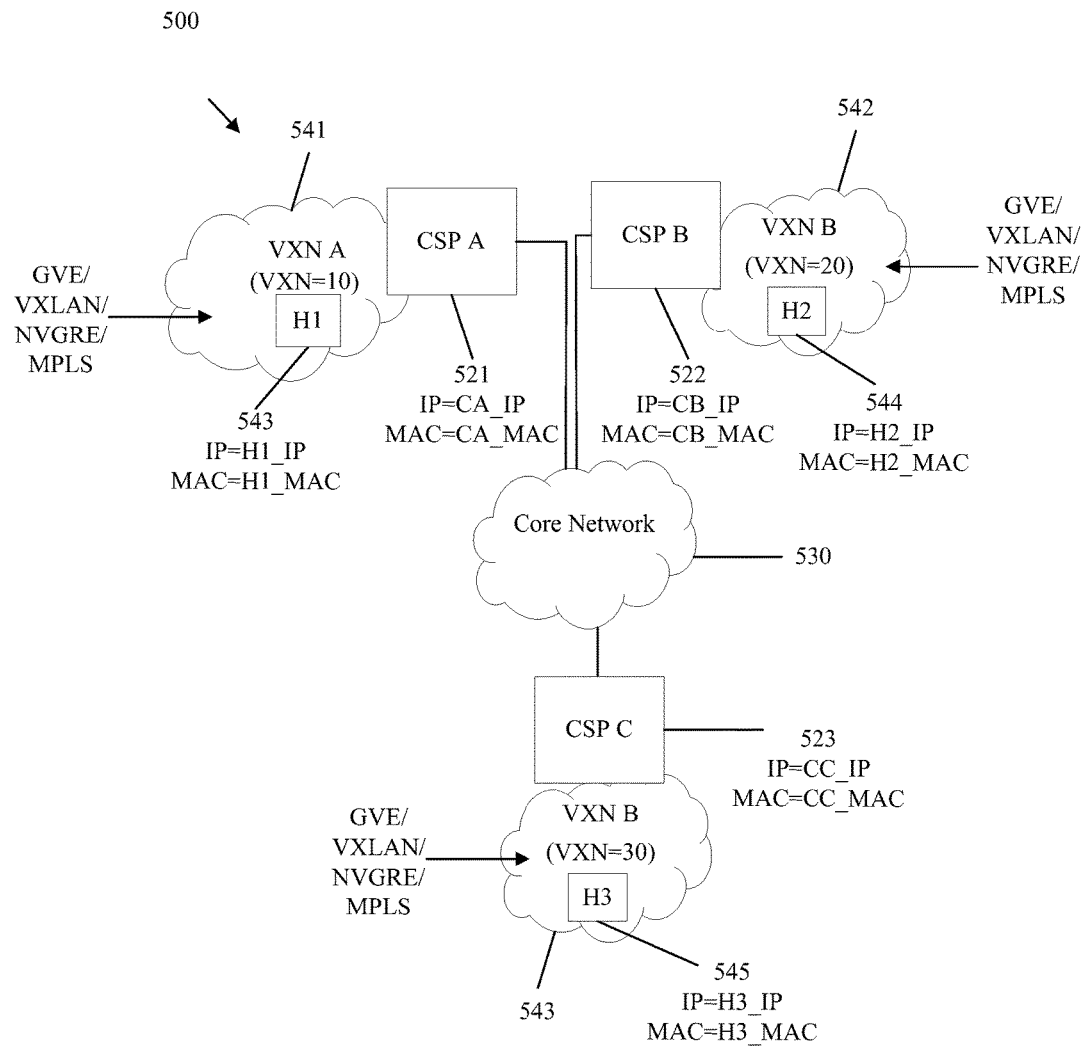
FIG. 5 a schematic diagram of a portion of a cloudcasting network system.

FIG. 5 is a schematic diagram of a portion of the cloudcasting network system 500. As shown, the cloudcasting network system 500 comprises a CSP A 521, a CSP B 522, and a CSP C 523 that are similar to the CSPs 120 and communicatively coupled to a core network 530 similar to the core network 130. The system 500 further comprises a VXN A 541, a VXN B 542, and a VXN C 543 that are similar to the VXNs 140 and attached to the CSP A 521, a CSP B 522, and a CSP C 523, respectively. As shown, CSP A 521 has an IP address of CA_IP and a MAC address of CA_MAC, CSP B 522 has an IP address of CB_IP and a MAC address of CB_MAC, and CSP C 523 has an IP address of CC_IP and a MAC address of CC_MAC. The VXN A 541 is identified by a VXN number of 10 and comprises a VNE 543 with an IP address of H1_IP and a MAC address of H1_MAC. The VXN B 542 is identified by a VXN number of 20 and comprises a VNE 544 with an IP address of H2_IP and a MAC address of H2_MAC. The VXN C 543 is identified by a VXN number of 30 and comprises a VNE 545 with an IP address of H3_IP and a MAC address of H3_MAC. The VNEs 543-545 may be any virtual networking devices executing on VMs and/or servers.

In some embodiments, VXN A 541, a VXN B 542, and a VXN C 543 may each employ one of an MPLS protocol, an NVGRE protocol, a VXLAN protocol, or a GVE protocol. In one embodiment, VXN A 541, a VXN B 542, and a VXN C 543 may each employ different virtualization protocols. For example, suppose VXN A 541 employs the MPLS protocol for data forwarding, VXN B 542 employs a GVE protocol for data forwarding, and VXN C 543 employs an NVGRE protocol for data forwarding. In such a case, when a user data packet is to-be transmitted from CSP A 521 to CSP B 522, CSP A 521 encapsulates the user data packet by adding a virtualization header (e.g., virtualization header 420) to the user data packet. The virtualization header is the GVE header since the destination CSP B 522 employs the GVE protocol for data forwarding. CSP A 521 may further encapsulate the user data packet adding an outer header and an inner header to the user data packet with the virtualization header based on data path parameters of the CSP B 522. The outer header may comprise an address of the CSP B 522 based on a AFI associated with CSP B 522 stored at the CSP-VXN mapping DB for CSP B 522. The inner header may comprise an address of the VNE 544 based on a SAFI associated with CSP B 522 stored at the CSP-VXN mapping DB for CSP B 522. The CSP B 522 may then decapsulate the encapsulated user data packet. If the CSP B 522 intends to the transmit the user data packet to CSP B C 523, CSP B 522 encapsulates the user data packet by adding the virtualization header to the user data packet. The virtualization header is the NVGRE header since the destination CSP C 523 employs the NVGRE protocol for data forwarding. As shown, each of the CSPs 521-523 and the VNEs 543-545 can be accessed using an IP address or a MAC address. In this way, the embodiments disclosed herein support multiple different protocols used for virtual network routing.

Figure 6:
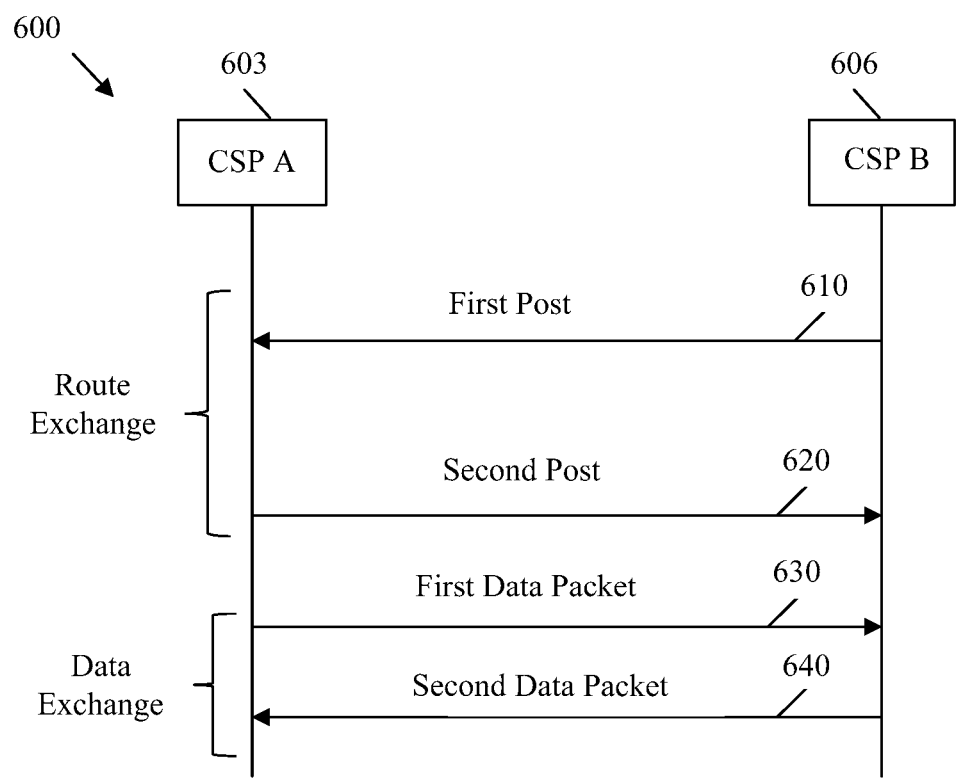
FIG. 6 illustrates a method of exchanging data in a cloudcasting network system.

FIG. 6 illustrates a method 600 of exchanging data in the cloud casting network system 600. The method 600 is implemented after the CSP A 603 and the CSP B 606 completed registration with a CRP by employing the steps of 310-340 in the method 300. In an embodiment, the CRP is similar the CRP 110. In an embodiment, CSP A 603 and CSP B 606 are similar to CSP A 521 and CSP B 522, respectively. The CSP A 603 and the CSP B 606 employ similar route exchange mechanisms as described in the method 300 and similar data forwarding mechanisms as described in the method 400. At step 610, the CSP B 606 sends a first post message to the CSP A 603. The first post message comprises virtual routing information of the VXN associated with CSP B 606 (e.g., VXN B 542).

The virtual routing information comprises information associated with the VXN of CSP B 606, such as VXN ID, a VXN type ID, an AFI, a SAFI, network addresses of CSP B 606 and VNEs located in the corresponding VXNs, network information options, routes, and/or any combination thereof. The VXN ID of the CSP B 606 may be 20 (VXN ID of VXN B 542) and included in the virtual routing information sent by CSP B 606. The VXN type ID may be 0, which is a pre-defined alpha-numeric value that indicates that CSP B employs the GVE protocol for data forwarding. The VXN type ID of 0 may be included in the virtual routing information sent by CSP B 606. The AFI is an identifier signaling an address format for the CSP B 606 and is included in the virtual routing information sent by CSP B 606. For example, the AFI may be 1 when CSP B 606 is identified by an IPv4 address, and the AFI may be 2 when CSP B 606 is identified by an IPv6 address. The SAFI is an ID signaling whether the whether the VNE (e.g., VNE 544) associated with CSP B 606 can be addressed using unicast address, multicast address, MAC address, or 802.1Q address. For example, for L3 payloads, the SAFI is 1 when the address of the VNE associated with CSP B 606 is a unicast address, and the SAFI is 2 when the address of the VNE associated with CSP B 606 is a multicast address. For L2 payloads, the SAFI may be 3 when the address of the VNE associated with CSP B 606 is a MAC address, and the SAFI may be 4 when the address of the VNE associated with CSP B 606 is an 802.1Q address. As should be appreciated, the alphanumeric values that can be included in the VXN type ID, an AFI, a SAFI field of the post message can be any value assigned by the IANA to uniquely represent a corresponding VXN ID type, CSP type, and VNE type, respectively. In an embodiment, the virtual routing information of the post message also includes a route to the VNE associated with CSP B 606. Upon receiving the first post message, the CSP A 603 stores the virtual routing information in association with the CSP B 606 in a CSP-VXN mapping DB, as described more fully below.

At step 620, the CSP A 603 sends a second post message to the CSP B 603. The second post message comprises virtual routing information of a VXN associated with CSP A 603 (e.g., VXN A 541). The virtual routing information comprises information associated with the VXN of CSP A 603, such as a VXN ID, a VXN type ID, an AFI, a SAFI, network addresses CSP A 603 VNEs located in the corresponding VXNs, network information options, routes, and/or any combination thereof. Similarly, upon receiving the second post message, the CSP B 606 stores the virtual routing information in a CSP-VXN mapping DB.

At step 630, the CSP A 603 forwards a first encapsulated data packet comprising similar format as the transport packet 440 to the CSP B 606. For example, the CSP A 603 receives a first user data packet similar to the user data packet 430 from the associated VXN (e.g., VXN A 541), where the user data packet is originated from the associated VNE (e.g., VNE 543) and destined to the VNE (e.g., VNE 544) associated with CSP B 606. The CSP A 621 parses the first user data packet, determines a destination VNE, a destination CSP, and an encapsulation protocol for the destination CSP according to the CSP-VXN mapping DB. The encapsulation protocol is determined using the control protocol parameters and the data plan parameters stored at the CSP-VXN mapping DB for each destination address. The CSP A 603 generates the first encapsulated data packet by encapsulating the first user data packet with an outer header (e.g., outer header 410), a virtualization header (e.g., virtualization header 420), and an inner header (e.g., inner header and payload type 430). The encapsulation header indicates the VXN number (e.g., VXN number=10) of the destination VXN (e.g., VXN B 542) associated with CSP B 606. The details of the first encapsulated data packet are described more fully below.

When the CSP B 606 receives the first data packet from CSP A 603, the CSP B 606 extracts the original first user data packet received by the CSP A 603, forms a second data packet from the extracted first user data packet according to a protocol format employed by the VXN associated with CSP B 606 and sends the second data packet to the VXN associated with CSP B 606. At step 640, the CSP B 606 forwards a second encapsulated data packet comprising a similar format as the transport packet 440 and the first encapsulated data packet to the CSP A 603. The details of the second encapsulated data packet are described more fully below.

Figure 7:
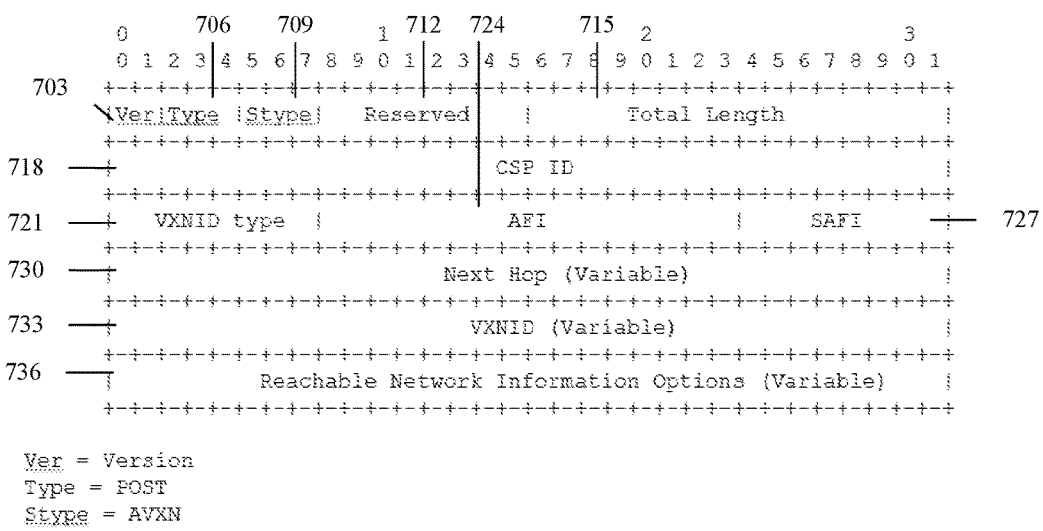
FIG. 7 is an embodiment of a post message used in the method for exchanging data in a cloudcasting network system.

FIG. 7 is an embodiment of a post message 700 used in the method 600 for exchanging data in the cloudcasting network system. The post message 700 may be similar to the first post message and second post message that are sent by the CSPs as part of method 600, which is implemented after the relevant CSPs have completed registration with a CRP. As shown in FIG. 7, the post message 700 includes fields such as, but not limited to, a version field 703, a type field 706, an Stype field 709, a reserved field 712, a total length field 715, a CSP ID field 718, a VXN ID type field 721, an AFI field 724, a SAFI field 727, a next hop field 730, a VXN ID field 733, and the network information options field 736. As should be appreciated, the post message 700 may include other fields that are not shown in FIG. 7. In an embodiment, a CSP may send the post message 700 to all remote and peer CSPs, or neighboring CSPs, that are coupled to the CSP sending the post message 700 (first CSP).

The version field 703 may include a value representing a version of a protocol used to generate the post message 700 to ensure compatibility between devices running different versions of the protocol. The type field 706 may include a value that identifies the post message 700 as being a post message that includes values representing control protocol parameters and/or data path parameters. The Stype field 709 includes a value indicating that the post message 700 includes information regarding a reachable VXN or an unreachable VXN. In the embodiment shown in FIG. 7, the Stype field 709 specifies "AVXN" because the post message 700 is being sent by a CSP associated with a reachable VXN. In such a case, the peer CSP adds the contents of the post message 700 to the CSV-VXN mapping DB, generates additional control protocol parameters and data path parameters based on the contents of the post message 700, and/or stores the additional control protocol parameters and data path parameters in the CSV-VXN mapping DB in association with the first CSP.

The reserved field 712 may be reserved or left empty. The total length field 715 specifies the total length of the post message 700. The CSP ID field 718 specifies an ID of the CSP. In an embodiment, the ID of the CSP is a 32 bit ID uniquely identifying the CSP that sends the post message 700. The VXN ID type field 721 includes the VXN type ID of the VXN associated with the CSP sending the post message 700. The VXN type ID may be a unique value representing various virtualization protocols, such as, but not limited to, a GVE protocol, an NVGRE protocol, a VXLAN protocol, and an MPLS protocol. For example, the IANA may define the unique value for each of the different virtualization protocols. In an embodiment, a peer CSP may obtain the VXN type ID from the VXN ID type field 721 of the post message 700 and store the VXN type ID at a local CSV-VXN mapping DB stored at a memory of the peer CSP in association with the first CSP. In an embodiment, the peer CSP may encapsulate a user data packet to include a virtualization header (e.g., virtualization header 402) associated with the VXN type ID before forwarding the encapsulated user data packet to the CSP that sent the post message 700.

The AFI field 724 includes the AFI that specifies an address format or type of the CSP that sends the post message 700. In an embodiment, the AFI may be an ID that uniquely represents an address format and/or an outer header that should be used when sending user data packets to first CSP. For example, the IANA may define AFI for each of the different types of address formats a CSP may be. For example, the AFI may be 1 when the first CSP is identified by an IPv4 address, and the AFI may be 2 when the first CSP is identified by an IPv6 address. In an embodiment, the peer CSP may obtain the AFI from the AFI field 724 and store the AFI at a local CSV-VXN mapping DB in association with the first CSP. In an embodiment, the peer CSP may encapsulate the user data packet to further include an outer header (e.g., outer header 401) based on the type of the CSP identified by the AFI before transmitting the encapsulated user data packet to the first CSP. The outer header may include an address, according to address type specified by the AFI, of the CSP that sent the post message 700. For example, the peer CSP encapsulates the user data packet to include an IPv4 header as the outer header of the encapsulated packet (also including the virtualization header) when the AFI is the value that uniquely represents IPv4. Similarly, the peer CSP may encapsulate the user data packet to include an IPv6 header as the outer header of the encapsulated packet (also including the virtualization header) when the AFI is the value that uniquely represents IPv6.

The SAFI field 727 includes the SAFI that specifies whether one or more VNEs (e.g., VNE 544) in a VXN attached to the first CSP can be addressed using a unicast address, multicast address, MAC address, or 802.1Q address. In an embodiment, the SAFI may be an ID that uniquely represents each of the different types of addresses of a VNE and/or an inner header that should be used when sending user data packets to the CSP that sends the post message 700. For example, the IANA may define SAFI for each of the different types of addresses a VNE may be accessed by. For example, the SAFI may be 1 when the VNE can be addressed using a unicast address, and the SAFI may be 2 when the VNE can be addressed using a multicast address. The IANA may need to define new SAFIs that uniquely represent when the VNE can be addressed using a MAC address or an 802.1Q address. For example, the IANA may assign the SAFI of 3 for when the VNE can be accessed using a MAC address, and the IANA may assign the SAFI of 4 for when the VNE can be accessed using an 802.1Q address. In an embodiment, the peer CSP may obtain the SAFI from the SAFI field 727 and store the SAFI at a local CSV-VXN mapping DB in association with the first CSP. In an embodiment, the peer CSP may encapsulate the user data packet to further include an inner header (e.g., inner header 403) according to address type specified by the SAFI before transmitting the encapsulated user data packet to first CSP. The inner header may include an address, according to address type specified by the SAFI, of the VNE associated with the CSP that sent the post message 700. For example, the peer CSP encapsulates the user data packet to further include an MAC header as the inner header of the encapsulated packet (also including the virtualization header and the outer header) when the SAFI is the value that uniquely represents that the VNE should be addressed using a MAC address. The MAC header may include the MAC address of the VNE in the VXN attached to the first CSP.

The next hop field 730 specifies the address of the first CSP and may be of a variable length based on the address format. The address of the CSP sending the post message may be based on the address type indicated by the AFI in the AFI field 724. For example, if the AFI field 724 includes an ID for an IPv4 address type, the next hop field 730 will include an IPv4 address of the first CSP. The VXN ID field 733 includes the virtualization header that would need to be added to user data packets that are sent to the CSP sending the post message 700. The VXN ID field 733 is of variable length since the virtualization header is based on the VXN type ID included in the VXN ID type field 721. For example, if the VXN ID type field 721 includes an ID associated with the GVE protocol, the VXN ID field 733 will include the GVE header.

The network information options field 736 includes information about the VXN associated with the first CSP and may be various lengths based on the information being sent. If the Stype field 709 specifies "AVXN," which indicates that the post message 700 is being sent by a CSP associated with reachable VXNs, the network information options field 736 includes information about the reachable VXNs. In such a case, the peer CSP adds the contents of the post message 700 to the CSV-VXN mapping DB, generates additional control protocol parameters and data path parameters based on the contents of the post message 700, and/or stores the additional control protocol parameters and data path parameters in the CSV-VXN mapping DB. The structure and contents of the network information options field 736 is further described in FIG. 9.

Figure 8:
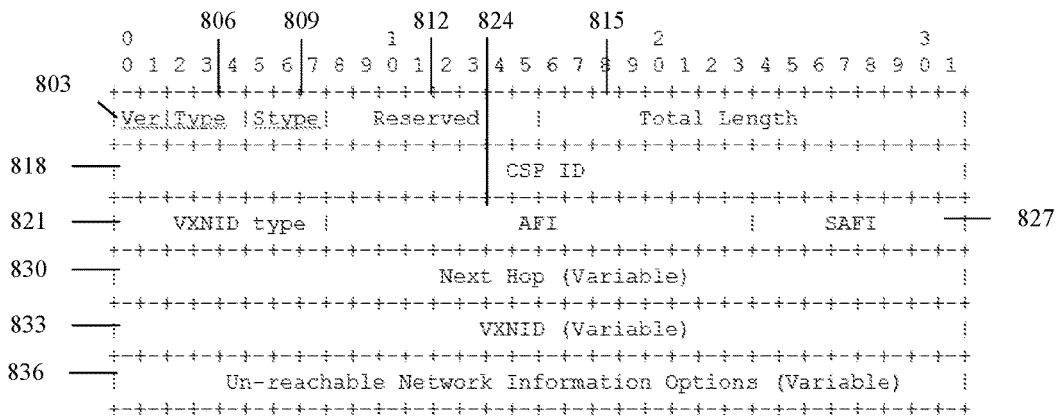
FIG. 8 is an embodiment of a post message used in the method for exchanging data in a cloudcasting network system.

FIG. 8 is an embodiment of a post message 800 used in the method 600 for exchanging data in the cloudcasting network system. The post message 800 may be similar to the first post message and second post message that are sent by the CSPs as part of method 600, which is implemented after the relevant CSPs have completed registration with a CRP. The post message 800 is similar to post message 700, except that Stype field 809 of post message 800 indicates that the post message 800 is being sent by a CSP associated with un-reachable VXNs and the network information options field 836 of post message 800 includes information about the un-reachable VXNs. As shown in FIG. 8, the post message 800 includes fields such as, but not limited to, a version field 803, a type field 806, an Stype field 809, a reserved field 812, a total length field 815, a CSP ID field 818, a VXN ID type field 821, an AFI field 824, a SAFI field 827, a next hop field 830, a VXN ID field 833, and the network information options field 836. As should be appreciated, the post message 800 may include other fields that are not shown in FIG. 8. In an embodiment, a CSP may send the post message 800 to all remote and peer CSPs, or neighboring CSPs, that are coupled to the CSP sending the post message 800 (first CSP).

The version field 803 is similar to the version field 703 and includes a value representing a version of a protocol used to generate the post message 800. The type field 806 is similar to the type field 706 and includes a value that identifies the post message 800 as being a post message that includes values representing control protocol parameters and/or data path parameters. The reserved field 812 is similar to the reserved field 712 that may be reserved or left empty. The total length field 815 is similar to the total length field 715 and specifies the total length of the post message 800. The CSP ID field 818 is similar to CSP ID field 718 and specifies an ID of the CSP. The VXN ID type field 821 is similar to VXN ID type field 721 and includes the VXN type ID of the VXN associated with the CSP sending the post message 800. The AFI field 824 is similar to AFI field 724 and includes the AFI that specifies an address format or type of the CSP that sends the post message 800. The SAFI field 827 is similar to SAFI field 727 and includes the SAFI that specifies whether one or more VNEs (e.g., VNE 544) in a VXN attached to the first CSP can be addressed using a unicast address, multicast address, MAC address, or 802.1Q address. The next hop field 830 is similar to the next hop field 730 and specifies the address of the first CSP and may be of a variable length based on the address format. The VXN ID field 833 is similar to the VXN ID field 733 and includes the virtualization header that would need to be added to user data packets that are sent to the CSP sending the post message 800.

In the embodiment shown in FIG. 8, the Stype field 809 specifies "IVXN" when the post message 800 is being sent by a CSP associated with an unreachable VXN. In such a case, the peer CSP deletes the records in the CSV-VXN mapping DB related the first CSP since the first CSP is unreachable. The network information options field 836 includes information about the VXN associated with the first CSP and may be various lengths based on the information being sent. Since the Stype field 809 specifies "IVXN," which indicates that the post message 800 is being sent by a CSP associated with un-reachable VXNs, the network information options field 836 includes information about the un-reachable VXNs. In such a case, the peer CSP deletes the records in the CSV-VXN mapping DB related the first CSP since the first CSP is unreachable. The structure and contents of the network information options field 836 is further described in FIG. 9.

FIG. 9 is an embodiment of a network information options field 900 included in the post messages 700 and 800. The network information options field 900 is similar to the network information options fields 736 and 836. The network information options field 900 includes several fields, such as, but not limited to, an options (OPT) field 903, a total network length (total network len) field 906, and a network_1 field 909A to a network_N field 909N. As should be appreciated, the network information options field 900 may include other fields that are not shown in FIG. 9, and there may be any number of network_N fields as necessary to describe the VXNs associated with the CSP sending the post message.

The OPT field 903 specifies an address type of the VNEs associated with the CSP sending the post message including the network information options field 900. The value included in the OPT field 903 may be based on the SAFI included in the SAFI field (e.g., SAFI field 727) of the post message. For example, the OPT field 903 may include the value 1 when the SAFI represents the IPv4 or IPv6. The OPT field 903 may include the value 2 when the SAFI represents MAC. The OPT field 903 may include the value of 3 when SAFI represents 802.1Q. An 802.1Q address is similar to a MAC address, except that the 802.1 address further includes a VLAN ID. For example, an 802.1Q address may include a 3 bit priority indicator, a 1 bit canonical format indicator, a 12 bit VLAN ID, and a 6 byte Ethernet address.

The total network len field 906 defines the size of the network information options field 900. The network_1 field 909A to network_N field 909N includes information related to the VXNs associated with the first CSP. In an embodiment, the network_1 field 909A to network_N field 909N each include address of a VNE associated with the CSP sending the post message including the network information options field 900. The addresses may be formatted according to the SAFI and the value in the OPT field 903. For example, if the SAFI and the value in the OPT field 903 are associated with IPv6, then the addresses in the network_1 field 909A to network_N field 909N are IPv6 addresses. If the Stype field (e.g., Stype field 709) of the post message specifies "AVXN," the address of the VNEs in the network_1 field 909A the network_N field 909N are addresses of reachable VNEs. If the Stype field (e.g., Stype field 809) of the post message specifies "IVXN," the address of the VNEs in the network_1 field 909A to network_N field 909N are addresses of un-reachable VNEs. As should be appreciated, the network_1 field 909A to network_N field 909N may be a variable number of bits.

FIG. 10A illustrates a first portion of an embodiment of a CSP-VXN mapping DB 1000. The DB 1000 corresponds to the CSP-VXN mapping DB generated by the CSP A 603 after the first post message is received at step 610. As shown, the DB 1000 comprises a control protocol parameter section 1003, a data path parameter section 1006, and a use case section 1009. The control protocol parameter section 1003 comprises columns for the CSP peering address 1012, the VXN type ID 815, the AFI 1018, the SAFI 1021, the next hop address format 1025, the network information format 1027, and the VXN header 1030. The data parameter section comprises columns for the outer header protocol and address 1033, the VXN header 1036, and the inner payload type 1039. The use case section 1009 indicates the types of VXNs and CSPs that are being mapped at each row (record) in the DB 1000. The DB 1000 may comprise a plurality of records, such as record 1050. The record 1050 is associated with one CSP and one or more VNEs and/or VXNs associated with the CSP. The records shown in DB 1000 are associated with the L3VPN.

As should be appreciated, the data that is shown as being stored in DB 1000 is for illustrative purposes only. In some embodiments, there may be more data related to each CSP, VNE, and/or VXN stored in the DB 1000. For example, the column indicating the CSP ID for each of the records is not shown in DB 1000, but may be otherwise be stored in DB 1000. In some embodiments, there may be less data related to each CSP, VNE, and/or VXN stored in the DB 1000. For example, the DB 1000 may only include the columns for the VXN type ID 1015, AFI 1018, and SAFI 1021 for each CSP and/or VNE.

Suppose a peer CSP receives a post message from a first CSP, and the post message comprises a CSP ID in the CSP ID field (e.g., CSP ID field 718), a VXN type ID of 0 (for a GVE header) in the VXN ID type field (e.g., VXN ID type field 721), an AFI of 1 (for an IPv4 address) in the AFI field (AFI field 724), a SAFI of 1 (for a unicast address) in the SAFI field (SAFI field 727), an address for the CSP in a next hop field (e.g., next hop field 733), and an address for a VNE associated with the CSP in a network_1 field (e.g., network_1 field 809A). In this case, the peer CSP obtains the CSP ID from the post message and generates a record 1050 in the DB 1000 in which a value for IPv4 is stored at the column for the CSP peering address 1012. The peer CSP obtains the VXN type ID of 0 from the post message and stores the VXN type ID of 0 in the column for the VXN type ID 1015. The peer CSP obtains the AFI of 1 from the post message and stores the AFI of 1 in the column for the AFI 1018. The peer CSP obtains the SAFI of 1 from the post message and stores the SAFI of 1 in the column for the SAFI 1021.

In an embodiment, the peer CSP may use the VXN type ID, AFI, and SAFI to generate the remaining control protocol parameters 1030. In an embodiment, the peer CSP determines that the next hop address type for the first CSP in record 1050 is associated with the address type represented by the AFI, which is an IPv4 address type. The peer CSP may store this determination in the column for the next hop address format 1025 as being the same as AFI. In an embodiment, the peer CSP determines that the address type for one or more VNEs associated with the first CSP in record 1050 is identified by the address type represented by the SAFI, which is an IPv4 prefix unicast type. The peer CSP may store this determination in the column for the network information format 1027 as being the IPv4 prefix unicast. In an embodiment, the peer CSP determines that the virtualization protocol used by the first CSP is based on the VXN type ID, which is the GVE protocol represented by the VXN type ID 0 in record 1050. The peer CSP may store this determination in the column for the VXN header 1030 as being the GVE header.

In an embodiment, the peer CSP may use the control protocol parameters 1030 and the remaining data received in the post message to generate the data path parameters 1006 that will be stored in DB 1000. The peer CSP may determine that the outer header of user data packets that are to be transmitted to the first CSP is based on the AFI and the next hop address of the first CSP stored at record 1050. For example, the peer CSP determines that the outer header for user data packets should be an IPv4 header because the AFI includes the ID for an IPv4 address type. The peer CSP may also obtain the next hop address for the CSP that sent the post message from the next hop field of the post message. The peer CSP may store the determination of the type of outer header and the address for the first CSP in the column for the outer header protocol and address 1033. In an embodiment, the peer CSP may encapsulate a user data packet to include an IPv4 header as the outer header of the user data packet before transmitting the encapsulated user data packet to the first CSP. The IPv4 header may include the next hop address for the first CSP. The IPv4 header may also include an indication that GVE is the protocol being employed by the first CSP.

The peer CSP may also determine the virtualization header of the user data packets that are to be transmitted to the first CSP based on the VXN Type ID. For example, the peer CSP determines that the virtualization header for user data packets should be a GVE header because the VXN type ID includes the ID for a GVE protocol, as shown in record 1050. The peer CSP may store the determination of the virtualization header in the VXN header field 1036. In an embodiment, the peer CSP may encapsulate a user data packet to further include a GVE header (in addition to the outer header) before transmitting the encapsulated user data packet to the first CSP. As shown in DB 1000, the MPLS header may be used as the outer header protocol and address. When the virtualization protocol of a destination CSP is a GVE protocol, the MPLS header may be bundled with a specific service for which the GVE is used as the virtual network ID of an L3 VPN. The MPLS header can be allocated and populated by LDP, BGP, or resource reservation protocol (RSVP). When the virtualization protocol of a destination CSP is an MPLS protocol, the MPLS header may be bundled with a specific service for which another MPLS header is used as the virtual network ID of an L3 VPN. The MPLS header can be allocated and populated by LDP, BGP, or RSVP.

The peer CSP may also determine the inner header of the user data packets that are to be transmitted to the first CSP based on the SAFI and the addresses of the VNEs associated with the first. In an embodiment, the peer CSP determines that the VNEs associated with the first CSP should be addressed according to the SAFI included in the post message. For example, if the SAFI indicates that the VNE associated with the first CSP is to be addressed using a unicast IPv4 address, then the inner header will include the unicast IPv4 address of the VE associated with the CSP. The peer CSP may obtain the unicast IPv4 address from the network_1 field of the post message.

As shown in FIG. 10A, a peer CSP generates the contents of the record 1050 using a post message sent by the first CSP such that when the peer CSP receives a user data packet from a VXN to transmit to the first CSP, the peer CSP encapsulates the data packet according to contents of record 1050. For example, when a user data packet originating from a VXN is received at the peer CSP that stores the DB 1000, the peer CSP encapsulates the user data packet using the data path parameters 1006 before transmitting the encapsulated user data packet to the CSP corresponding to record 1050.

Figure 10B:
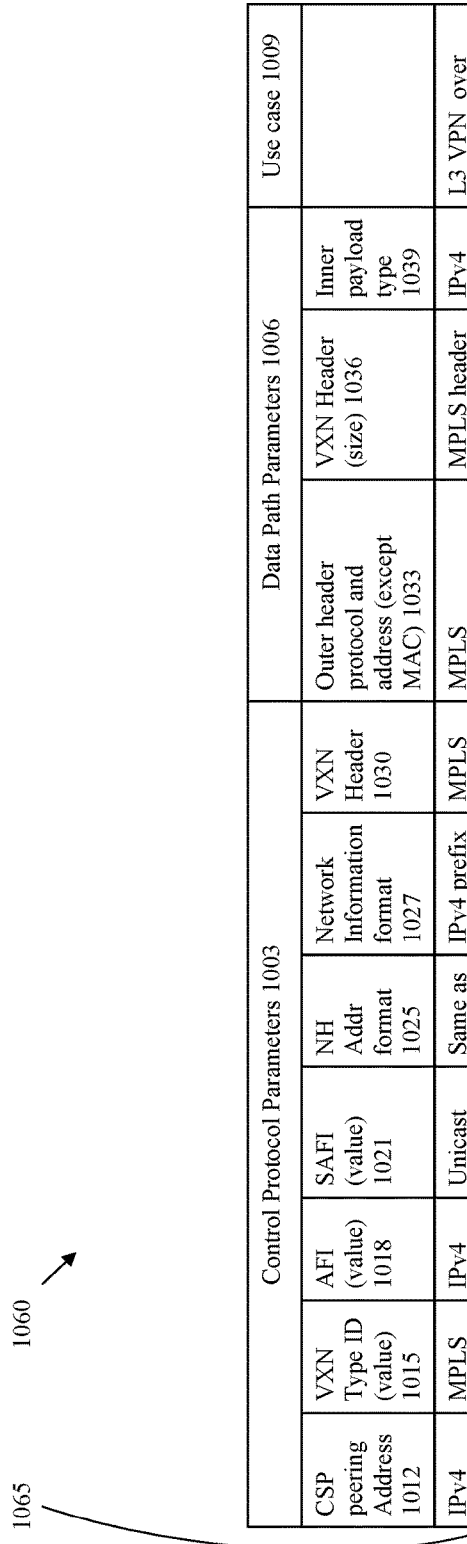

FIG. 10B illustrates a second portion of the embodiment of a CSP-VXN mapping DB 1060. The records shown in DB 1060 are similar to the records shown in DB 1000. The column for the VXN header 1030 in the control protocol parameters 1003 indicate the MPLS header, and the column for the VXN header 1036 in the data path parameters 1006 also indicate the MPLS header. The columns for the outer header protocol and address 1033 also indicate that an MPLS header should be used as the outer header of user data packets that are to be transmitted to respective CSPs. When the virtualization protocol of a destination CSP is an MPLS protocol, the MPLS header can be bundled with a specific service for which another MPLS label is used as the virtual network ID of an Ethernet virtual private network (VPN). The MPLS header can be allocated and populated by LDP, BGP, or RSVP. In the column for the outer header protocol and address 1033, some records indicate that the bottom of the stack bit (S) is set to one for the last entry in the label stack (i.e., for the bottom of the stack) and zero for all other label stack entries. When S=0, the current MPLS label is not the last MPLS label, and there is at least one other label below the current MPLS label. When S=1, the current MPLS label is the last MPLS label, and there is no other label below the current MPLS later.

For example, when a peer CSP receives a user data packet that is to be transmitted to the CSPs mapped to record 1065, the peer CSP obtains the encapsulation data from the data path parameters 1006. The peer CSP encapsulates the user data packet to include an MPLS header as the outer header, an MPLS header as the virtualization header, and an IPv4 header as the inner header of the user data packet. The MPLS header that is the outer header may include an address of the CSP according to the address type identified by the AFI in record 1065. The MPLS header that is the virtualization header may include an ID of one or more VXNs associated with the CSP. The IPv4 header that is the inner header may include an address of the VNE associated with the CSP according to the address type identified by the SAFI in record 1065.

FIG. 10C illustrates a third portion of the embodiment of a CSP-VXN mapping DB 1070. The records shown in DB 1070 are similar to the records shown in DB 1000 except that the records shown in DB 1070 are for L2VPNs. The column for the VXN header 1030 in the control protocol parameters 1003 indicate either the GVE header, NVGRE header, or the MPLS header, which is determined by the IDs in the column for AFIs 1018. The column for the SAFIs indicate "New SAFI MAC" because a SAFI value that uniquely identifies MAC addresses has yet to be established. However, as should be appreciated, the records in the column for the SAFIs include a value representing that the VNEs associated with the respective CSPs should be addressed using a MAC address. In this way, the records in the column for network information 1027 also indicate that the VNEs should be addressed by a corresponding MAC address or Ethernet address.

When the virtualization protocol of a destination CSP is an MPLS protocol, the MPLS header can be bundled with a specific service for which another MPLS label is used as the virtual network ID of an Ethernet 802.1Q VPN. The MPLS header can be allocated and populated by LDP, BGP, or RSVP.

FIG. 10D illustrates a fourth portion of the embodiment of a CSP-VXN mapping DB 1080. The records shown in DB 1080 are similar to the records shown in DB 1070. The column for the VXN header 1030 in the control protocol parameters 1003 indicate either the GVE header, VXLAN header, or the MPLS header, which is determined by the IDs in the column for AFIs 1018. The column for the SAFIs indicate "New SAFI MAC" because a SAFI value that uniquely identifies 802.1Q addresses has yet to be established. 802.1Q addresses are similar to the MAC addresses except that the 802.1Q addresses additionally includes a VLAN ID. As should be appreciated, the records in the column for the SAFIs include a value representing that the VNEs associated with the respective CSPs should be addressed using a 802.1Q address. In this way, the records in the column for network information 1027 also indicate that the VNEs should be addressed by a corresponding 802.1Q address or Ethernet address. The Ethernet address may be 8 octets.

Figure 11:
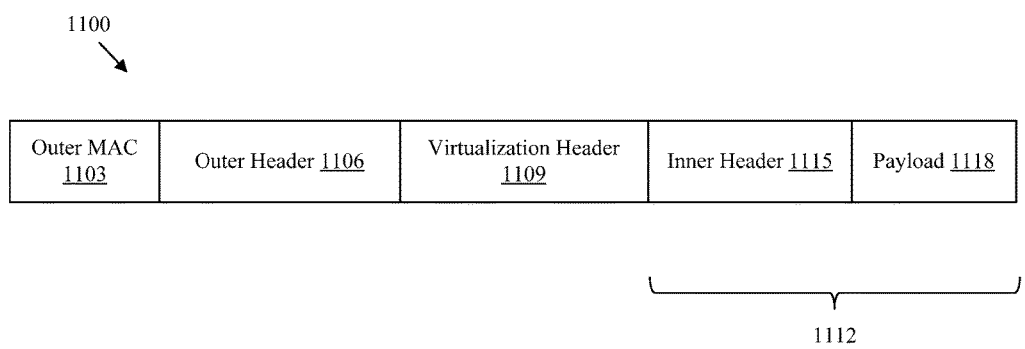
FIG. 11 illustrates an embodiment of a transport packet transported in a cloudcasting network system.

FIG. 11 illustrates an embodiment of a transport packet 1100 transported in the cloudcasting network system 500. The transport packet 1100 corresponds to the first encapsulated data packet sent by the CSP A 521 at step 630. The transport packet 1100 comprises a similar format as the transport packet 440. The transport packet 1100 comprises an outer MAC 1101, an outer header 1103, a virtualization header 1106, and a user data packet 1112 comprising an inner header 1115 and a payload 1118. The user data packet 1112 corresponds to the first user data packet originated from the VXN, for example VXN A 541. The outer MAC 1103 may be an Ethernet header and applies to all cases. The outer header 1106 is similar to the outer header 411 and can be either an IP header or an MPLS header. For example, the core network 530 is an IP network. Thus, the outer header 1106 indicates that the destination CSP address is CSP A 521's IP address and the source CSP address is CSP B 522's IP address. When the core network 540 is a MAC network, the outer header 1106 indicates that the destination CSP address is CSP A 521's MAC address and the source CSP address is CSP B 522's MAC address. The virtualization header 1109 is similar to the virtualization head 411 and indicates that the destination VXN is the VXN B 542 (e.g., VXN=10). The virtualization header 1109 may be a GVE header, an NVGRE header, a VXLAN header, or an MPLS header, depending on the virtualization protocol employed by CSP A 521. The inner header 1115 indicates that the source of the payload 1118 is the either the MAC address or the IP address of VNE 544. Similarly, the inner header 1115 also indicates that the destination of the payload 1118 is either the MAC address or the IP address of the VNE 543. CSP B 522 determines whether to use an IP address or a MAC address to identify CSP A 521 based on an AFI stored at the local CSP-VXN mapping DB (e.g., CSP-VXN mapping DB 900). Similarly, CSP B 522 determines whether to use an IP address, MAC address, or 802.1Q address to identify the VNE 544 based on a SAFI stored at the local CSP-VXN mapping DB. It should be noted that the CSP A 521 may further attach other network protocol headers to the transport packet 1100 for transmission.

Figure 12:
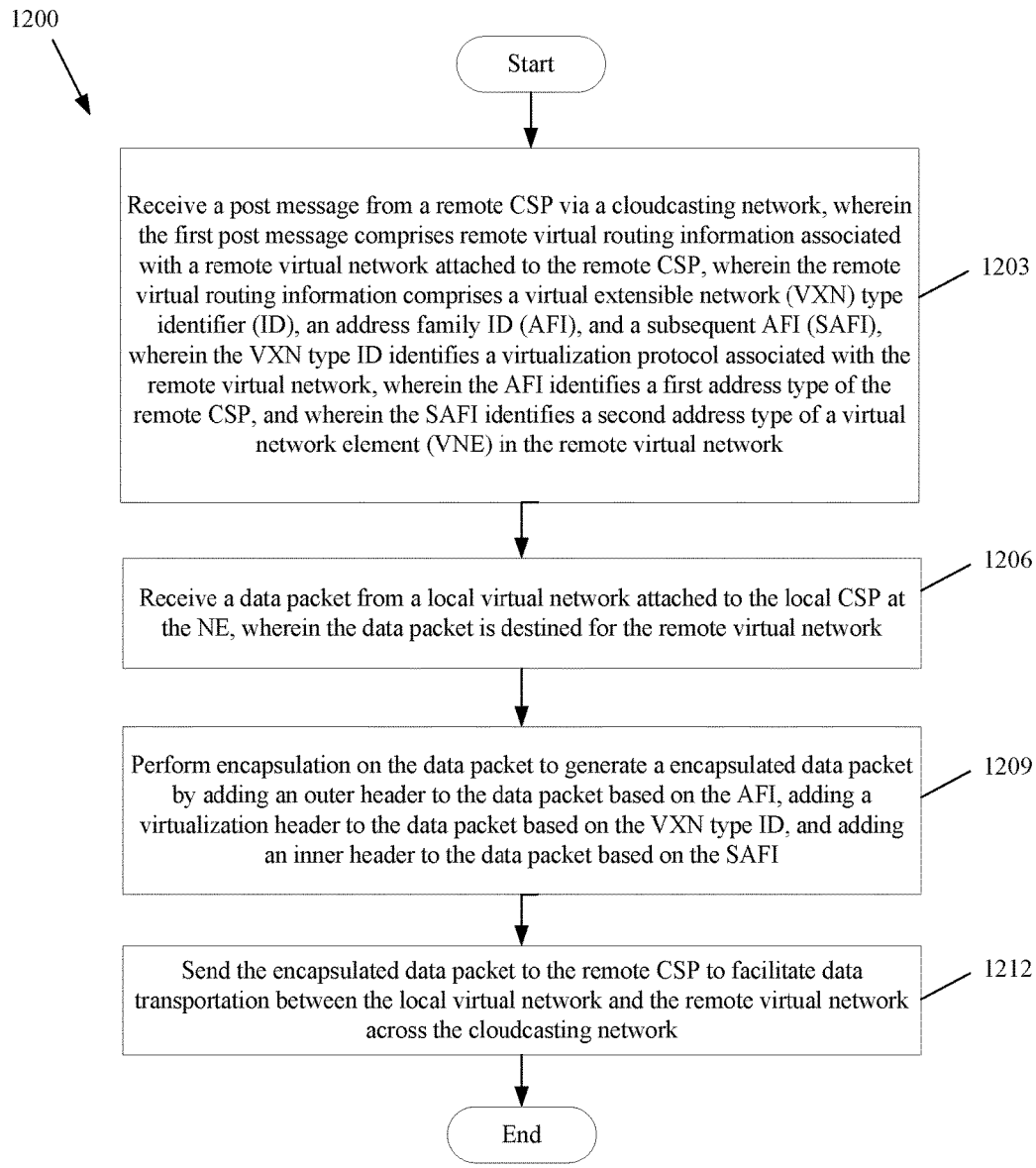
FIG. 12 a flowchart of an embodiment of a method for performing encapsulation based on the contents of the post message.

FIG. 12 is a flowchart of an embodiment of method 1200 for performing encapsulation based on contents of the post message. The method 1200 is implemented by a local CSP, such as the CSPs 120, in a cloudcasting network, such as the network systems 100 and 500. The method 1200 employs similar mechanisms as the method 600. The method 1200 is implemented after the local CSP registered with a CRP such as the CRP 120 by employing the method 300. For example, the local CSP obtained information associated with other CSPs in the network such as the network addresses of the other CSPs and corresponding attached virtual networks such as the VXNs 140, 541, and 542. At step 1203, a post message (e.g., post message 700 or 800) is received from a remote CSP via a cloudcasting network such as system 100. For example, Tx/Rx 210 receives the first post message from the remote CSP. The first post message comprises remote virtual routing information associated with a remote virtual network attached to the remote CSP. The remote virtual routing information comprises a VXN type ID, an AFI, and a SAFI. The VXN type ID identifies a virtualization protocol associated with the remote virtual network. The AFI identifies an address type of the remote CSP. The SAFI identifies an address type of a VNE in the remote virtual network.

At step 1206, a data packet is received from a local virtual network attached to the local CSP at the NE. For example, Tx/Rx 210 receives the data packet from the local virtual network. The data packet is destined for the remote virtual network. At step 1209, encapsulation is performed on the data packet to generate an encapsulated data packet. For example, the processor 230 performs encapsulation on the data packet to generate the encapsulated data packet. The encapsulation involves adding an outer header to the data packet based on the AFI, adding a virtualization header to the data packet based on the VXN type ID, and adding an inner header to the data packet based on the SAFI. At step 1212, the encapsulated data packet is transmitted to the remote CSP to facilitate data transportation between the local virtual network and the remove virtual network across the cloudcasting network.

Figure 13:
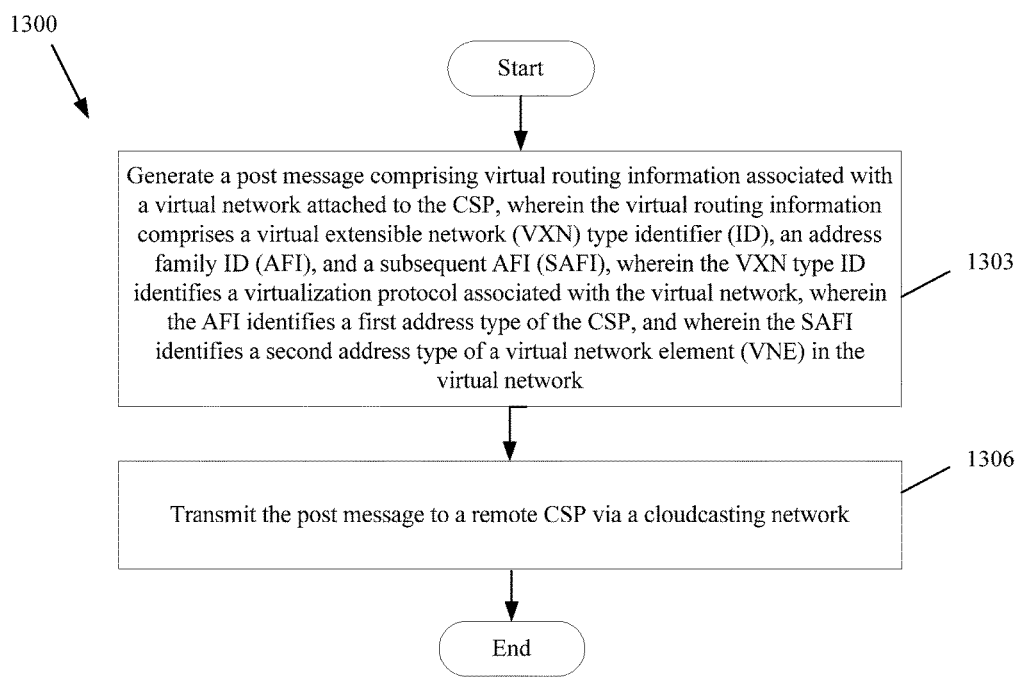
FIG. 13 is a flowchart of an embodiment of a method for generating and sending a post message.

FIG. 13 is a flowchart of an embodiment of method 1300 for generating and sending a post message 700 or 800. The method 1300 is implemented by a local CSP, such as the CSPs 130, in a cloudcasting network, such as the network systems 100 and 500. The method 1300 employs similar mechanisms as the method 600 and 1100. The method 1300 is implemented after the local CSP registered with a CRP such as the CRP 110 by employing the method 300. For example, the local CSP obtained information associated with other CSPs in the network such as the network addresses of the other CSPs and corresponding attached virtual networks such as the VXNs 140, 541, and 542. At step 1303, a post message (e.g., post messages 700 and 800) is generated. For example, processor 230 generates the post message. The post message comprises virtual routing information associated with a virtual network attached to the CSP. The virtual routing information comprises a VXN type ID, an AFI, and a SAFI. The VXN type ID identifies a virtualization protocol associated with the virtual network. The AFI identifies an address type of the CSP. The SAFI identifies an address type of a VNE in the virtual network. At step 1306, the post message is transmitted to a remote CSP via a cloudcasting network. For example, Tx/Rx 210 transmits the post message to the remote CSP.

The embodiments disclosed herein are advantageous in that CSPs, VXNs, and VNEs may use one seamless control protocol for virtual or overlay networking that supports multiple different virtualization protocols. The embodiments disclosed herein apply to NVO3, L2 VPN, and L3 VPN.

In an embodiment, the disclosure includes a method implemented by an NE configured as a local CSP, comprising a means for receiving a post message from a remote CSP via a cloudcasting network, wherein the first post message comprises remote virtual routing information associated with a remote virtual network attached to the remote CSP, wherein the remote virtual routing information comprises a VXN type ID, an AFI, and a SAFI, wherein the VXN type ID identifies a virtualization protocol associated with the remote virtual network, wherein the AFI identifies an address type of the remote CSP, and wherein the SAFI identifies an address type of a VNE in the remote virtual network, a means for receiving a data packet from a local virtual network attached to the local CSP at the NE, wherein the data packet is destined for the remote virtual network, a means for encapsulating a data packet to generate a encapsulated data packet by adding an outer header to the data packet based on the AFI, adding a virtualization header to the data packet based on the VXN type ID, and adding an inner header to the data packet based on the SAFI, and a means for sending the encapsulated data packet to the remote CSP to facilitate data transportation between the local virtual network and the remote virtual network across the cloudcasting network.

In an embodiment, the disclosure includes an NE configured as a CSP, comprising a means for storing remote virtual routing information in association with an ID of a remote CSP in a mapping table, wherein the remote virtual routing information is associated with a remote virtual network attached to the remote CSP, and wherein the remote virtual routing information comprises a VXN type ID, an AFI, and a SAFI, a means for performing encapsulation on a data packet to generate a encapsulated data packet by adding an outer header to the data packet based on the AFI, adding a virtualization header to the data packet based on the VXN type ID, and adding an inner header to the data packet based on the SAFI, and a means for transmitting the encapsulated data packet to the remote CSP to facilitate data transportation between the local virtual network and the remote virtual network across a cloudcasting network.

In an embodiment, the disclosure an NE configured as a CSP, comprising a means for generating a post message comprising virtual routing information associated with a virtual network attached to the CSP, wherein the virtual routing information comprises a VXN type ID, an AFI, and a SAFI, wherein the VXN type ID identifies a virtualization protocol associated with the virtual network, wherein the AFI identifies an address type of the CSP, and wherein the SAFI identifies an address type of a VNE in the virtual network, and a means for transmitting the post message to a remote CSP via a cloudcasting network.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) configured as a local cloud switch point (CSP), the method comprising:

receiving, via a receiver at the NE, a post message from a remote CSP via a cloudcasting network, wherein the post message comprises remote virtual routing information associated with a remote virtual network associated with the remote CSP, wherein the remote virtual routing information comprises a virtual extensible network (VXN) type identifier (ID), an address family ID (AFI), and a subsequent AFI (SAFI), wherein the VXN type ID identifies a virtualization protocol associated with the remote virtual network, wherein the AFI identifies an address type of the remote CSP, and wherein the SAFI identifies an address type of a virtual network element (VNE) in the remote virtual network;

receiving, via the receiver, a data packet from a local virtual network associated with the local CSP, wherein the data packet is destined for the remote virtual network;

encapsulating, via a processor of the NE, the data packet to generate an encapsulated data packet by adding an outer header to the data packet based on the AFI, adding a virtualization header to the data packet based on the VXN type ID, and adding an inner header to the data packet based on the SAFI; and sending, via a transmitter at the NE, the encapsulated data packet to the remote CSP to facilitate data transportation between the local virtual network and the remote virtual network across the cloudcasting network.

2. The method of claim 1, wherein the remote CSP employs the virtualization protocol to forward data traffic to other CSPs, and wherein the VXN type ID identifies at least one of a generic VXN encapsulation (GVE) protocol, a virtual extensible local area network (VXLAN) protocol, a Network Virtualization using Generic Routing Encapsulation (NVGRE) protocol, or Multiprotocol Label Switching (MPLS) protocol.

3. The method of claim 1, wherein the AFI comprises an ID of at least one of an Internet protocol version four (IPv4) address and an Internet protocol version six (IPv6) address.

4. The method of claim 3, wherein the SAFI comprises an ID of a media access control address.

5. The method of claim 1, wherein the SAFI comprises an ID of an 802.1Q address.

6. The method of claim 5, further comprising storing the VXN type ID, AFI, and SAFI in a mapping database stored at a memory of the local CSP.

7. A network element (NE) configured as a local cloud switch point (CSP), comprising:
a memory configured to store remote virtual routing information in association with an identifier (ID) of a remote CSP in a mapping table, wherein the remote virtual routing information is associated with a remote virtual network associated with the remote CSP, and wherein the remote virtual routing information comprises a virtual extensible network (VXN) type identifier (ID), an address family ID (AFI), and a subsequent AFI (SAFI);
a processor coupled to the memory and configured to perform encapsulation on a data packet to generate an encapsulated data packet by adding an outer header to the data packet based on the AFI, adding a virtualization header to the data packet based on the VXN type ID, and adding an inner header to the data packet based on the SAFI; and
a transmitter coupled to the processor and configured to transmit the encapsulated data packet to the remote CSP to facilitate data transportation between the local virtual network and the remote virtual network across a cloudcasting network.

8. The NE of claim 7, further comprising a receiver coupled to the processor and configured to receive a post message from the remote CSP via the cloudcasting network, wherein the post message comprises the remote virtual routing information, wherein the remote virtual routing information further comprises a VXN ID, wherein the VXN ID identifies the remote virtual network in the cloudcasting network, wherein the VXN type ID identifies a virtualization protocol associated with the remote virtual network, wherein the AFI identifies an address type of the remote CSP, and wherein the SAFI identifies an address type of a virtual network element (VNE) in the remote virtual network.

9. The NE of claim 7, wherein the remote virtual routing information further indicates a plurality of virtual network elements (VNEs) in the remote virtual network, and wherein the processor is further configured to:
determine that a destination of the data packet corresponds to a first VNE of the plurality of VNEs in the remote virtual network according to the remote virtual routing information stored in the mapping table; and
obtain a VXN ID that identifies the remote virtual network in the cloudcasting network and an address of the first VNE from the mapping table after determining that the destination corresponds to the first VNE.

10. The NE of claim 7, wherein the virtualization header is a generic VXN encapsulation (GVE) header comprising the VXN ID when the VXN type ID indicates that the virtualization protocol associated with the remote virtual network is a GVE protocol.

11. The NE of claim 7, wherein the virtualization header is a virtual extensible local area network (VXLAN) header comprising the VXN ID when the VXN type ID indicates that the virtualization protocol associated with the remote virtual network is a VXLAN protocol.

12. The NE of claim 7, wherein the virtualization header is a network virtualization using generic routing encapsulation (NVGRE) header comprising the VXN ID when the VXN type ID indicates that the virtualization protocol associated with the remote virtual network is a NVGRE protocol.

13. The NE of claim 7, wherein the virtualization header is a multiprotocol label switching (MPLS) header comprising the VXN ID when the VXN type ID indicates that the virtualization protocol associated with the remote virtual network is a MPLS protocol.

14. A network element (NE) configured as a cloud switch point (CSP), comprising:
a processor configured to generate a post message comprising virtual routing information associated with a virtual network associated with the CSP, wherein the virtual routing information comprises a virtual extensible network (VXN) type identifier (ID), an address family ID (AFI), and a subsequent AFI (SAFI), wherein the VXN type ID identifies a virtualization protocol associated with the virtual network, wherein the AFI identifies an address type of the CSP, and wherein the SAFI identifies an address type of a virtual network element (VNE) in the virtual network; and
a transmitter coupled to the processor and configured to transmit the post message to another CSP via a cloudcasting network.

15. The NE of claim 14, wherein the AFI comprises an ID of at least one of an Internet protocol version four (IPv4) address and an Internet protocol version six (IPv6) address.

16. The NE of claim 15, wherein the SAFI comprises an ID of at least one of a unicast address or a multicast address.

17. The NE of claim 14, wherein the SAFI comprises an ID of at least one of a unicast address, multicast address, a media access control (MAC) address, or an 802.1Q address.

18. The NE of claim 14, wherein the post message is transmitted after the CSP has completed registration with a cloud rendezvous point (CRP) in the cloudcasting network.

19. The NE of claim 14, wherein the post message further comprises an address of the CSP, and wherein the address is formatted according to the AFI.

20. The NE of claim 14, wherein the post message further comprises a plurality of addresses of a plurality of VNEs in the virtual network, and wherein the addresses of the VNEs are formatted according to the SAFI.

21. A cloudcasting network system, comprising:
a local cloud switch point (CSP) comprising a transmitter configured to transmit a post message to a remote CSP, wherein the post message comprises virtual routing information associated with a virtual network associated with the local CSP, wherein the virtual routing information comprises a virtual extensible network (VXN) type identifier (ID), an address family ID (AFI), and a subsequent AFI (SAFI), wherein the VXN type ID identifies a virtualization protocol associated with the virtual network, wherein the AFI identifies an address type of the remote CSP, and wherein the SAFI identifies an address type of a virtual network element (VNE) in the virtual network; and a remote CSP communicatively coupled to the local CSP and comprising:
   a receiver configured to receive the post message from the local CSP;
     a processor coupled to the receiver and configured to perform encapsulation on a data packet to generate an encapsulated data packet by adding an outer header to the data packet based on the AFI, adding a virtualization header to the data packet based on the VXN type ID, and adding an inner header to the data packet based on the SAFI; and
   a transmitter coupled to the processor and configured to transmit the encapsulated data packet to the local CSP to facilitate data transportation between the local virtual network and the remote virtual network across a cloudcasting network.

\* \* \* \* \*